United States Patent
Micu

(10) Patent No.: US 10,206,341 B2
(45) Date of Patent: Feb. 19, 2019

(54) RAINFALL PREDICTION AND COMPENSATION IN IRRIGATION CONTROL

(71) Applicant: Rain Bird Corporation, Azusa, CA (US)

(72) Inventor: Anderson I. Micu, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 704 days.

(21) Appl. No.: 14/805,411

(22) Filed: Jul. 21, 2015

(65) Prior Publication Data

US 2016/0014983 A1 Jan. 21, 2016

Related U.S. Application Data

(60) Provisional application No. 62/027,026, filed on Jul. 21, 2014.

(51) Int. Cl.
*A01G 25/16* (2006.01)
*G05B 15/02* (2006.01)

(52) U.S. Cl.
CPC ........... *A01G 25/167* (2013.01); *G05B 15/02* (2013.01)

(58) Field of Classification Search
CPC ...... A01G 1/001; A01G 22/00; A01G 25/023; A01G 25/165; A01G 25/167; A01G 27/003; G05B 15/02
USPC ................................................ 700/282, 284
See application file for complete search history.

(56) References Cited

U.S. PATENT DOCUMENTS

| | | | |
|---|---|---|---|
| 3,808,385 A | 4/1974 | Klinefelter |
| 4,015,366 A | 4/1977 | Hall |
| 4,646,224 A | 2/1987 | Ransburg |
| 4,760,547 A | 7/1988 | Duxbury |
| 4,856,227 A | 8/1989 | Oglevee |
| 4,858,377 A | 8/1989 | Oglevee |
| 4,922,433 A | 5/1990 | Mark |
| 4,962,522 A | 10/1990 | Marian |
| 5,021,939 A | 6/1991 | Pulgiese |
| 5,023,787 A | 6/1991 | Evelyn-Veere |
| 5,025,361 A | 6/1991 | Pitman |
| 5,038,268 A | 8/1991 | Krause |
| 5,097,861 A | 3/1992 | Hopkins |
| 5,101,083 A | 3/1992 | Tyler |
| 5,208,855 A | 5/1993 | Marian |
| 5,229,937 A | 7/1993 | Evelyn-Veere |
| 5,251,153 A | 10/1993 | Nielsen |

(Continued)

*Primary Examiner* — Chun Cao
(74) *Attorney, Agent, or Firm* — Fitch, Even, Tabin & Flannery LLP

(57) ABSTRACT

Some embodiments provide methods of controlling irrigation, comprising: obtaining a barometric pressure (BP) profile corresponding to changes in BP over a period of time and corresponding to a location where irrigation is to be controlled; determining a dew point factor (DPF) profile as a function of changes in temperature and relative humidity over the period of time and corresponding to the location where irrigation is to be controlled; making a determination that a rain event is likely to occur as a function of both the BP profile and the DPF profile; and generating, based on the determination that the rain event is likely to occur, a control signal configured to cause one or both of current and scheduled irrigation to be limited.

28 Claims, 10 Drawing Sheets

(56) References Cited

U.S. PATENT DOCUMENTS

| | | | |
|---|---|---|---|
| 5,333,785 | A | 8/1994 | Dodds |
| 5,444,611 | A | 8/1995 | Woytowitz |
| 5,465,904 | A | 11/1995 | Vaello |
| 5,479,339 | A | 12/1995 | Miller |
| 5,496,112 | A | 3/1996 | Browne |
| 5,497,339 | A | 3/1996 | Bernard |
| 5,668,719 | A | 9/1997 | Bobrov |
| 5,696,671 | A | 12/1997 | Oliver |
| 5,839,658 | A | 11/1998 | Sarver |
| 5,870,302 | A | 2/1999 | Oliver |
| 6,088,621 | A | 7/2000 | Woytowitz |
| 6,102,061 | A | 8/2000 | Addink |
| 6,108,590 | A | 8/2000 | Hergert |
| 6,145,755 | A | 11/2000 | Feltz |
| 6,227,220 | B1 | 5/2001 | Addink |
| 6,259,970 | B1 | 7/2001 | Brundisini |
| 6,276,298 | B1 | 8/2001 | Welsh |
| 6,298,285 | B1 | 10/2001 | Addink |
| 6,312,191 | B1 | 11/2001 | Rosenfeld |
| 6,314,340 | B1 | 11/2001 | Mecham |
| 6,343,255 | B1 | 1/2002 | Peek |
| 6,401,530 | B1 | 6/2002 | Roman |
| 6,452,499 | B1 | 9/2002 | Runge |
| 6,453,215 | B1 | 9/2002 | Lavoie |
| 6,453,216 | B1 | 9/2002 | McCabe |
| 6,570,109 | B2 | 5/2003 | Klinefelter |
| 6,585,168 | B1 | 7/2003 | Caprio |
| 6,675,098 | B2 | 1/2004 | Peek |
| 6,748,327 | B1 | 6/2004 | Watson |
| 6,782,311 | B2 | 8/2004 | Barlow |
| 6,823,239 | B2 | 11/2004 | Sieminski |
| 6,850,819 | B1 | 2/2005 | Townsend |
| 6,874,707 | B2 | 4/2005 | Skinner |
| 6,892,113 | B1 | 5/2005 | Addink |
| 6,892,114 | B1 | 5/2005 | Addink |
| 6,895,987 | B2 | 5/2005 | Addink |
| 6,898,467 | B1 | 5/2005 | Smith |
| 6,947,811 | B2 | 9/2005 | Addink |
| 6,950,728 | B1 | 9/2005 | Addink |
| 6,963,808 | B1 | 11/2005 | Addink |
| 6,977,351 | B1 | 12/2005 | Woytowitz |
| 7,010,394 | B1 | 3/2006 | Runge |
| 7,010,396 | B2 | 3/2006 | Ware |
| 7,048,204 | B1 | 5/2006 | Addink |
| 7,050,887 | B2 | 5/2006 | Alvarez |
| 7,058,478 | B2 | 6/2006 | Alexanian |
| 7,058,479 | B2 | 6/2006 | Miller |
| 7,096,094 | B2 | 8/2006 | Addink |
| 7,111,179 | B1 | 9/2006 | Girson |
| 7,123,993 | B1 | 10/2006 | Freeman |
| 7,133,749 | B2 | 11/2006 | Goldberg |
| 7,146,254 | B1 | 12/2006 | Howard |
| 7,203,576 | B1 | 4/2007 | Wilson |
| 7,216,020 | B2 | 5/2007 | Marian |
| 7,216,659 | B2 | 5/2007 | Caamano |
| 7,229,026 | B2 | 6/2007 | Evelyn-Veere |
| 7,236,249 | B1 | 6/2007 | Michenfelder |
| 7,243,459 | B2 | 7/2007 | Kaprielian |
| 7,245,991 | B1 | 7/2007 | Woytowitz |
| 7,248,945 | B2 | 7/2007 | Woytowitz |
| 7,257,465 | B2 | 8/2007 | Perez |
| 7,266,428 | B2 | 9/2007 | Alexanian |
| 7,280,892 | B2 | 10/2007 | Bavel |
| 7,286,904 | B2 | 10/2007 | Graham |
| 7,289,886 | B1 | 10/2007 | Woytowitz |
| 7,305,280 | B2 | 12/2007 | Marian |
| 7,317,972 | B2 | 1/2008 | Addink |
| 7,330,796 | B2 | 2/2008 | Addink |
| 7,337,042 | B2 | 2/2008 | Marian |
| 7,339,957 | B2 | 3/2008 | Hitt |
| 7,363,113 | B2 | 4/2008 | Runge |
| 7,383,721 | B2 | 6/2008 | Parsons |
| 7,386,289 | B2 | 6/2008 | Weller |
| 7,398,139 | B1 | 7/2008 | Woytowitz |
| 7,400,944 | B2 | 7/2008 | Bailey |
| 7,403,840 | B2 | 7/2008 | Moore |
| 7,406,363 | B2 | 7/2008 | Doering |
| 7,412,303 | B1 | 8/2008 | Porter |
| 7,421,317 | B2 | 9/2008 | Christiansen |
| 7,430,458 | B2 | 9/2008 | Dansereau |
| 7,444,207 | B2 | 10/2008 | Nickerson |
| 7,469,707 | B2 | 12/2008 | Anderson |
| 7,516,002 | B2 | 4/2009 | Veerasamy |
| 7,522,975 | B2 | 4/2009 | Perez |
| 7,526,365 | B1 | 4/2009 | Frerich |
| 7,546,181 | B2 | 6/2009 | Vidovich |
| 7,552,632 | B2 | 6/2009 | Runge |
| 7,558,650 | B2 | 7/2009 | Thornton |
| 7,574,284 | B2 | 8/2009 | Goldberg |
| 7,574,286 | B2 | 8/2009 | Hergert |
| 7,584,023 | B1 | 9/2009 | Palmer |
| 7,590,471 | B2 | 9/2009 | Jacobsen |
| 7,596,429 | B2 | 9/2009 | Cardinal |
| 7,613,546 | B2 | 11/2009 | Nelson |
| 7,613,547 | B1 | 11/2009 | Woytowitz |
| 7,633,398 | B2 | 12/2009 | DuFaux |
| 7,640,079 | B2 | 12/2009 | Nickerson |
| 7,658,336 | B2 | 2/2010 | Kates |
| 7,711,454 | B2 | 5/2010 | Addink |
| 7,742,862 | B2 | 6/2010 | Anderson |
| 7,750,805 | B2 | 7/2010 | Leggett |
| 7,782,311 | B2 | 8/2010 | Higashi |
| 7,789,321 | B2 | 9/2010 | Hitt |
| 7,809,475 | B2 | 10/2010 | Kaprielian |
| 7,844,368 | B2 | 11/2010 | Alexanian |
| 7,844,369 | B2 | 11/2010 | Nickerson |
| 7,853,363 | B1 | 12/2010 | Porter |
| 7,877,168 | B1 | 1/2011 | Porter |
| 7,883,027 | B2 | 2/2011 | Fekete |
| 7,883,029 | B2 | 2/2011 | Chalemin |
| 7,899,580 | B2 | 3/2011 | Cardinal |
| 7,912,588 | B2 | 3/2011 | Runge |
| 7,916,458 | B2 | 3/2011 | Nelson |
| 7,917,249 | B2 | 3/2011 | Jacobsen |
| 7,930,069 | B2 | 4/2011 | Savelle |
| 7,937,187 | B2 | 5/2011 | Kaprielian |
| 7,949,433 | B2 | 5/2011 | Hern |
| 7,953,517 | B1 | 5/2011 | Porter |
| 7,957,843 | B2 | 6/2011 | Sacks |
| 7,962,244 | B2 | 6/2011 | Alexanian |
| 7,962,245 | B2 | 6/2011 | Runge |
| 7,966,153 | B2 | 6/2011 | Bangalore |
| 7,996,115 | B2 | 8/2011 | Nickerson |
| 8,010,238 | B2 | 8/2011 | Ensworth |
| 8,014,904 | B1 | 9/2011 | Woytowitz |
| 8,019,482 | B2 | 9/2011 | Sutardja |
| 8,024,074 | B2 | 9/2011 | Stelford |
| 8,024,075 | B2 | 9/2011 | Fekete |
| 8,104,993 | B2 | 1/2012 | Hitt |
| 8,108,077 | B2 | 1/2012 | Smith |
| 8,185,248 | B2 | 5/2012 | Ensworth |
| 8,204,630 | B2 | 6/2012 | Wilson |
| 8,209,061 | B2 | 6/2012 | Palmer |
| 8,219,254 | B2 | 7/2012 | OConnor |
| 8,219,935 | B2 | 7/2012 | Hunts |
| 8,260,466 | B2 | 9/2012 | Altieri |
| 8,275,309 | B2 | 9/2012 | Woytowitz |
| 8,301,309 | B1 | 10/2012 | Woytoxitz |
| 8,326,440 | B2 | 12/2012 | Christfort |
| 8,401,705 | B2 | 3/2013 | Alexanian |
| 8,423,437 | B2 | 4/2013 | Benisti |
| 8,437,879 | B2 | 5/2013 | Anderson |
| 8,509,683 | B2 | 8/2013 | Woytowitz |
| 8,548,632 | B1 | 10/2013 | Porter |
| 8,620,480 | B2 * | 12/2013 | Alexanian ............... A01G 25/16 700/284 |
| 8,738,189 | B2 | 5/2014 | Alexanian |
| 8,977,400 | B1 | 3/2015 | Porter |
| 9,491,913 | B2 * | 11/2016 | Mayer .................. A01G 27/005 |
| 9,890,967 | B2 * | 2/2018 | Buduri .................... F24F 11/89 |
| 2001/0049563 | A1 | 12/2001 | Addink |
| 2002/0002425 | A1 | 1/2002 | Dossey |
| 2002/0010516 | A1 | 1/2002 | Addink |
| 2002/0014539 | A1 | 2/2002 | Pagano |

(56) References Cited

U.S. PATENT DOCUMENTS

| | | | |
|---|---|---|---|
| 2002/0020441 A1 | 2/2002 | Addink | |
| 2002/0029111 A1 | 3/2002 | Peek | |
| 2002/0060631 A1 | 5/2002 | Runge | |
| 2002/0072829 A1 | 6/2002 | Addink | |
| 2002/0166898 A1 | 11/2002 | Buhler | |
| 2002/0183935 A1 | 12/2002 | Skinner | |
| 2003/0079974 A1 | 5/2003 | Klinefelter | |
| 2003/0093159 A1* | 5/2003 | Sieminski | A01G 25/167 700/12 |
| 2003/0109964 A1 | 6/2003 | Addink | |
| 2003/0179102 A1 | 9/2003 | Barnes | |
| 2003/0182022 A1 | 9/2003 | Addink | |
| 2003/0183018 A1 | 10/2003 | Addink | |
| 2003/0208306 A1 | 11/2003 | Addink | |
| 2004/0003045 A1 | 1/2004 | Tucker | |
| 2004/0011880 A1 | 1/2004 | Addink | |
| 2004/0015270 A1 | 1/2004 | Addink | |
| 2004/0030456 A1 | 2/2004 | Barlow | |
| 2004/0039489 A1 | 2/2004 | Moore | |
| 2004/0089164 A1 | 5/2004 | Addink | |
| 2004/0181315 A1 | 9/2004 | Cardinal | |
| 2004/0217189 A1 | 11/2004 | Regli | |
| 2004/0225412 A1 | 11/2004 | Alexanian | |
| 2004/0244833 A1 | 12/2004 | Buhler | |
| 2005/0038529 A1 | 2/2005 | Perez | |
| 2005/0038569 A1 | 2/2005 | Howard | |
| 2005/0119797 A1 | 6/2005 | Marian | |
| 2005/0143842 A1 | 6/2005 | Marian | |
| 2005/0154498 A1 | 7/2005 | Townsend | |
| 2005/0171646 A1 | 8/2005 | Miller | |
| 2005/0187665 A1 | 8/2005 | Fu | |
| 2005/0187666 A1 | 8/2005 | Marian | |
| 2005/0199842 A1 | 9/2005 | Parsons | |
| 2005/0216127 A1 | 9/2005 | Clark | |
| 2005/0216128 A1 | 9/2005 | Clark | |
| 2005/0216129 A1 | 9/2005 | Clark | |
| 2005/0279856 A1 | 12/2005 | Nalbandian | |
| 2006/0100747 A1 | 5/2006 | Runge | |
| 2006/0116792 A1 | 6/2006 | Addink | |
| 2006/0122736 A1 | 6/2006 | Alexanian | |
| 2006/0155489 A1 | 7/2006 | Addink | |
| 2006/0157580 A1 | 7/2006 | Regli | |
| 2006/0161309 A1 | 7/2006 | Moore | |
| 2006/0172714 A1 | 8/2006 | Weller | |
| 2006/0184285 A1 | 8/2006 | Evelyn-Veere | |
| 2006/0202051 A1 | 9/2006 | Parsons | |
| 2007/0010915 A1 | 1/2007 | Burson | |
| 2007/0016334 A1 | 1/2007 | Smith | |
| 2007/0043480 A1 | 2/2007 | Hergert | |
| 2007/0055407 A1 | 3/2007 | Goldberg | |
| 2007/0132599 A1 | 6/2007 | Dufaux | |
| 2007/0156318 A1 | 7/2007 | Anderson | |
| 2007/0162201 A1 | 7/2007 | Veerasamy | |
| 2007/0179674 A1 | 8/2007 | Ensworth | |
| 2007/0185621 A1 | 8/2007 | Gilmore | |
| 2007/0191991 A1 | 8/2007 | Addink | |
| 2007/0293990 A1 | 12/2007 | Alexanain | |
| 2008/0027586 A1 | 1/2008 | Hern | |
| 2008/0027587 A1 | 1/2008 | Nickerson | |
| 2008/0034859 A1 | 2/2008 | Runge | |
| 2008/0039978 A1 | 2/2008 | Graham | |
| 2008/0091307 A1 | 4/2008 | Dansereau | |
| 2008/0097653 A1 | 4/2008 | Kaprielian | |
| 2008/0129495 A1 | 6/2008 | Hitt | |
| 2008/0154437 A1 | 6/2008 | Alexanian | |
| 2008/0223950 A1 | 9/2008 | Kates | |
| 2008/0234870 A1 | 9/2008 | Chalemin | |
| 2008/0249664 A1 | 10/2008 | Runge | |
| 2008/0251602 A1 | 10/2008 | Leggett | |
| 2008/0275595 A1 | 11/2008 | Bailey | |
| 2008/0288116 A1 | 11/2008 | Nickerson | |
| 2008/0288117 A1 | 11/2008 | Nickerson | |
| 2008/0319585 A1 | 12/2008 | Nickerson | |
| 2009/0007706 A1 | 1/2009 | Hitt | |
| 2009/0008471 A1 | 1/2009 | Wilson | |
| 2009/0076659 A1 | 3/2009 | Ensworth | |
| 2009/0099701 A1 | 4/2009 | Li | |
| 2009/0138105 A1 | 5/2009 | Crawford | |
| 2009/0150001 A1 | 6/2009 | Fekete | |
| 2009/0177330 A1 | 7/2009 | Kah | |
| 2009/0179165 A1 | 7/2009 | Parsons | |
| 2009/0216345 A1 | 8/2009 | Christfort | |
| 2009/0222141 A1 | 9/2009 | Ensworth | |
| 2009/0271043 A1 | 10/2009 | Roman | |
| 2009/0271044 A1 | 10/2009 | Bangalore | |
| 2009/0276102 A1 | 11/2009 | Smith | |
| 2009/0281672 A1 | 11/2009 | Pourzia | |
| 2009/0326723 A1 | 12/2009 | Moore | |
| 2010/0030389 A1 | 2/2010 | Palmer | |
| 2010/0030476 A1 | 2/2010 | Woytowitz | |
| 2010/0032493 A1* | 2/2010 | Abts | A01G 25/092 239/11 |
| 2010/0032495 A1* | 2/2010 | Abts | A01G 25/167 239/69 |
| 2010/0082170 A1 | 4/2010 | Wilson | |
| 2010/0100247 A1 | 4/2010 | Nickerson | |
| 2010/0106337 A1 | 4/2010 | Sacks | |
| 2010/0145531 A1 | 6/2010 | Nickerson | |
| 2010/0179701 A1 | 7/2010 | Gilbert | |
| 2010/0241279 A1 | 9/2010 | Castella | |
| 2010/0256827 A1 | 10/2010 | Bragg | |
| 2010/0268390 A1 | 10/2010 | Anderson | |
| 2010/0305764 A1 | 12/2010 | Carr | |
| 2010/0306012 A1 | 12/2010 | Zyskowski | |
| 2010/0324744 A1 | 12/2010 | Cox | |
| 2011/0015793 A1 | 1/2011 | Crist | |
| 2011/0015800 A1 | 1/2011 | Crist | |
| 2011/0040416 A1 | 2/2011 | Nickerson | |
| 2011/0093123 A1 | 4/2011 | Alexanian | |
| 2011/0137472 A1 | 6/2011 | Hitt | |
| 2011/0190947 A1 | 8/2011 | Savelle | |
| 2011/0190948 A1 | 8/2011 | Fekete | |
| 2011/0224836 A1 | 9/2011 | Hern | |
| 2011/0231025 A1 | 9/2011 | Sacks | |
| 2011/0238227 A1 | 9/2011 | Hern | |
| 2011/0238228 A1 | 9/2011 | Woytowitz | |
| 2011/0238229 A1 | 9/2011 | Woytowitz | |
| 2011/0238230 A1 | 9/2011 | Runge | |
| 2011/0270448 A1 | 11/2011 | Kantor | |
| 2011/0301767 A1 | 12/2011 | Alexanian | |
| 2012/0041606 A1 | 2/2012 | Standerfer | |
| 2012/0054125 A1* | 3/2012 | Clifton | G05B 15/02 705/412 |
| 2012/0072036 A1 | 3/2012 | Piper | |
| 2012/0095604 A1 | 4/2012 | Alexanian | |
| 2012/0221154 A1 | 8/2012 | Runge | |
| 2012/0239211 A1 | 9/2012 | Walker | |
| 2012/0253529 A1 | 10/2012 | Carlson | |
| 2012/0303168 A1 | 11/2012 | Halahan | |
| 2013/0040559 A1 | 2/2013 | Woytowitz | |
| 2013/0116837 A1 | 5/2013 | Malaugh | |
| 2016/0219806 A1* | 8/2016 | Thiessen | A01G 22/00 |

\* cited by examiner

RAINFALL PREDICTION AND COMPENSATION IN IRRIGATION CONTROL

This application claims the benefit of U.S. Provisional Application No. 62/027,026, filed Jul. 21, 2014, entitled RAINFALL PREDICTION AND COMPENSATION IN IRRIGATION CONTROL, for Anderson I. Micu, which is incorporated in its entirety herein by reference.

BACKGROUND

1. Field of the Invention

The present invention relates generally to irrigation, and more specifically to irrigation control.

2. Discussion of the Related Art

It is becoming increasingly important that irrigation controllers make efficient use of water. There have been several attempts to adjust the amount of water applied to landscape plant life based on weather conditions. Some attempts are based on mathematical models (known as evapotranspiration or ET) to determine plant watering requirements based on weather conditions. Attempts have been made to create solutions that approximate the results of the ET models by storing historical ET values which are adjusted using currently sensed temperature. However, the results are often questionable since weather is not always repeatable from year to year and factors other than temperature affect ET. Others have tried alternatives to the accepted ET models in an attempt to approximate the accepted ET models. These approaches again have unproven and uncertain results.

SUMMARY OF THE INVENTION

Some embodiments provide methods of controlling irrigation, comprising: obtaining a barometric pressure (BP) profile corresponding to changes in BP over a period of time and corresponding to a location where irrigation is to be controlled; determining a dew point factor (DPF) profile as a function of changes in temperature and relative humidity over the period of time and corresponding to the location where irrigation is to be controlled; making a determination that a rain event is likely to occur as a function of both the BP profile and the DPF profile; and generating, based on the determination that the rain event is likely to occur, a control signal configured to cause one or both of current and scheduled irrigation to be limited.

Further, some embodiments provide systems of controlling irrigation, comprising: a processor; and a memory coupled with the processor and storing program code that when implemented by the processor causes the processor to: obtain a barometric pressure (BP) profile corresponding to a change in BP over a period of time and corresponding to a location where irrigation is to be controlled; determine a dew point factor (DPF) profile proportional to changes in temperature and relative humidity over the period of time and corresponding to the location where irrigation is to be controlled; determine that a rain event is likely to occur as a function of both the current BP profile and the current DPF profile; and generate a control configured to cause one or both of current and scheduled irrigation to be limited based on the determination that the rain event is likely to occur.

In some embodiments, methods of controlling irrigation are provided that comprise: predicting that a rain event is likely to occur at a site to be irrigated; generating a correction factor in response to predicting the rain event, wherein the correction factor is configured to be applied in adjusting one or more irrigation runtimes implemented by an irrigation controller at the site to result in one or more corresponding adjusted irrigation runtimes that are less than the corresponding one or more irrigation runtimes; determining whether a sensed amount of rain is received sufficient to compensate for an estimated amount of water that was not distributed because of an implementation of the one or more adjusted irrigation runtimes; calculating a compensation factor in response to determining the received amount of rain is insufficient to compensate for the estimated amount of water that was not distributed in the implementation of the one or more adjusted irrigation runtimes; and causing the compensation factor to be applied in subsequently adjusting the one or more irrigation runtimes.

Additionally, some embodiments provide methods comprising: determining that a rain event is likely to occur as a function of at least a barometric pressure (BP) profile relative to a BP reference threshold and a dew point factor (DPF) profile relative to a DPF reference threshold; evaluating, as a function of two or more different predicted rain events, at least one of the BP reference threshold and the DPF reference threshold; identifying an inconsistency between a detection of an actual rain event and the at least one of the BP reference threshold and the DPF reference threshold; and adjusting at least one of the BP reference threshold and the DPF reference threshold in response to identifying the inconsistency.

BRIEF DESCRIPTION OF THE DRAWINGS

The above and other aspects, features and advantages of several embodiments of the present invention will be more apparent from the following more particular description thereof, presented in conjunction with the following drawings.

Figure 1A:
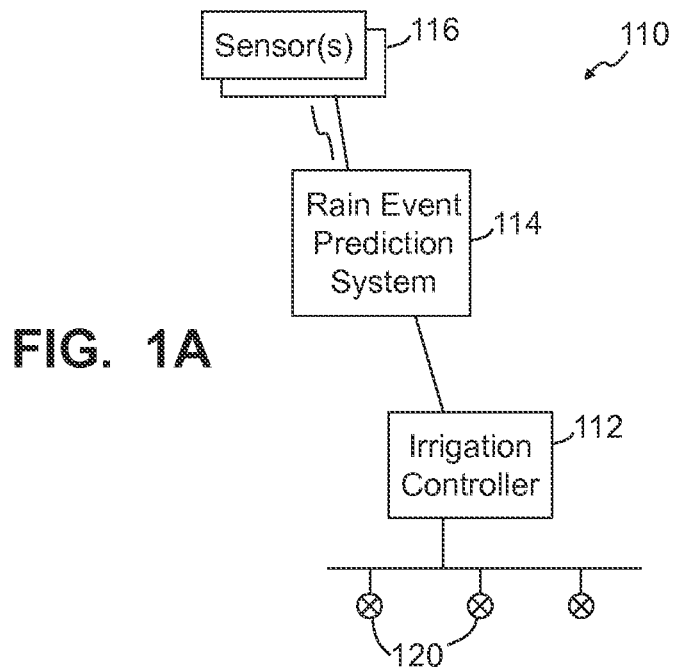
FIG. 1A depicts a simplified block diagram of an irrigation system in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1B:
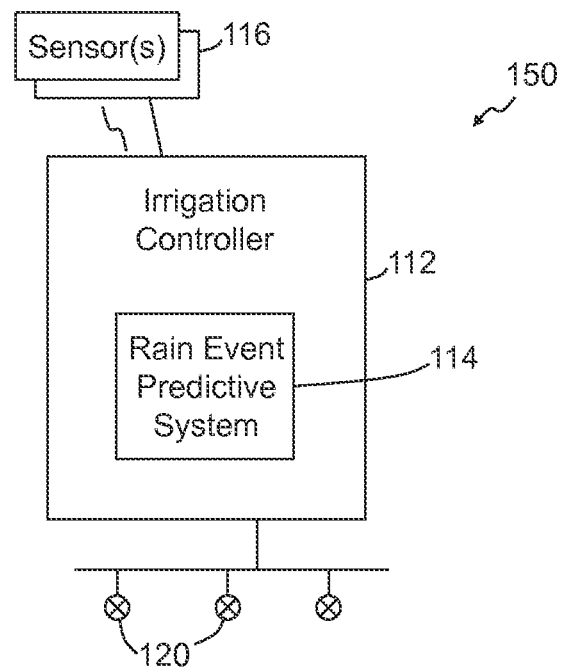
FIG. 1B depicts a simplified block diagram of an irrigation system in accordance with some embodiments.

FIG. 1A depicts a simplified block diagram of an irrigation system 110 in accordance with some embodiments. The irrigation system 110 includes an irrigation controller 112, a rain event prediction system and/or circuitry 114 and one or more sensors 116. FIG. 1B depicts a simplified block diagram of an irrigation system 150 in accordance with some embodiments. The irrigation system 150 includes an irrigation controller 112 that includes some or all of the rain event prediction system 114. One or more sensors 116 are coupled with and/or incorporated with the irrigation controller 112 or the rain prediction system 114.

Referring to FIGS. 1A-1B, the irrigation controller 112 can be substantially any relevant irrigation controller configured to control the activation of one or more valves 120, pumps and/or other such devices that allow water to be distributed over one or more areas to be irrigated, typically through one or more conduits. In many embodiments, the irrigation controller 112 is further configured to control irrigation over an irrigation area based on one or more irrigation schedules that dictate irrigation runtimes and/or durations that one or more valves are maintained in an open state allowing water to pass to water distribution devices (e.g., sprinklers, drip lines, etc.). The irrigation runtimes can be user defined, determined based on environmental conditions and/or a combination thereof. For example, in some embodiments, the irrigation controller is configured to implement an irrigation schedule that is determined based on one or more evapotranspiration (ET) values determined as a function of current and/or historic environmental conditions. In some embodiments, the irrigation controller is similar to the ESP series, SST series, SST smart series, or other such irrigation controllers available from Rain Bird Corporation.

The rain event prediction system 114 (referred to below for simplicity as the rain prediction system) couples with the irrigation controller 112 and the one or more sensors 116. The rain prediction system is configured to receive sensor data from the one or more sensors. Based at least in part on the sensor data the rain prediction system 114 is configured to make a determination of whether a rain event is likely to occur. In response to determining that a rain event is likely, the rain prediction system communicates the prediction, a control signal, instructions or the like to the irrigation controller 112. The irrigation controller is configured to utilize the prediction information, control signal or the like in limiting one or both of a current and/or a scheduled irrigation based on the determination that the rain event is likely to occur. For example, in some embodiments, the rain prediction system generates a correction factor configured to be applied in adjusting irrigation runtimes.

The sensors 116 can be substantially any relevant sensor that can provide relevant information to the rain prediction system 114 and/or the irrigation controller 112. For example, in some embodiments, the sensors include one or more of a temperature sensor, a barometric pressure sensor, moisture and/or rain sensor, humidity sensor, flow rate sensor, pressure sensor, and/or other such sensors. The rain prediction system 114 is configured to utilize the sensor data to predict whether a rain event is likely to occur, and typically whether rain is likely to occur within a given period of time. It is noted that the sensors 116 are depicted as separate from the rain prediction system 114 and/or the irrigation controller 112; however, in some embodiments one or more sensors may be incorporated with and/or within the rain prediction system and/or the irrigation controller. The sensors can be wired and/or wirelessly coupled with the rain prediction system 114 and/or the irrigation controller 112.

As introduced above, the rain prediction system 114 utilizes sensor data to determine whether a rain event is likely to occur in the near future (e.g., within the next week). In many instances, the accuracy of the prediction is greater the closer in time the rain event is predicted. In some embodiments, the prediction of whether a rain event is likely to occur is based on both barometric pressure (BP) and dew point.

Figure 2:
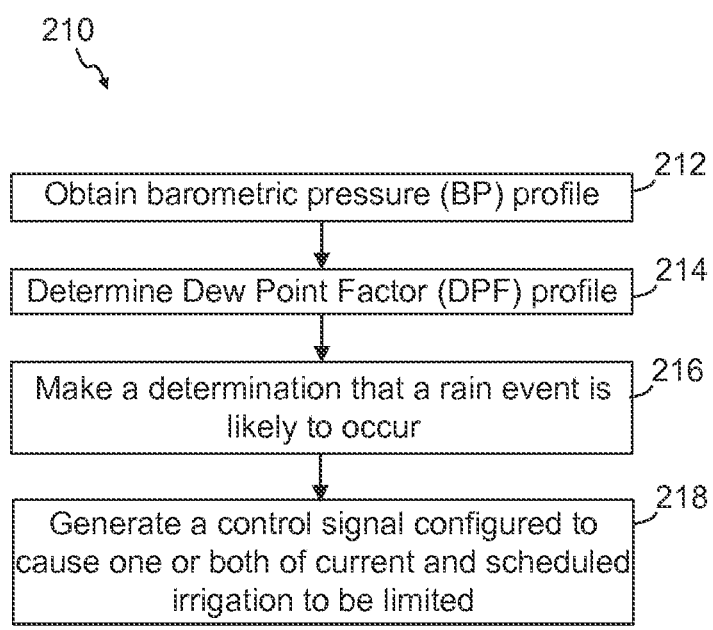
FIG. 2 shows a simplified flow diagram of a process of determining whether a rain event is likely, in accordance with some embodiments.

FIG. 2 shows a simplified flow diagram of a process 210 of determining whether a rain event is likely, in accordance with some embodiments. In step 212, a barometric pressure (BP) profile is obtained, where the BP profile corresponds to changes in the BP over a period of time at a location where irrigation is to be controlled (irrigation location). In some embodiments, the rain prediction system 114 generates the BP profile, in part, by receiving BP data from one or more sensors and tracking the BP data over at least the period of time. For example, in some embodiments, the rain prediction system 114 receives and stores BP data from a BP sensor positioned at the irrigation location or a BP sensor that has been designated as being relevant to the irrigation location (e.g., the BP sensor may be a BP sensor measuring a BP for a city, a neighborhood, or other such geographic area). The BP profile tracks the changes in the BP over time. One or more parameters of the BP profile may be used in evaluating and/or predicting whether a rain event is likely to occur. For example, a current BP value corresponding to a time when making the evaluation can be considered, a slope of the change in BP over a period of time and/or other such parameters may be considered.

In step 214, a dew point factor (DPF) profile is obtained and/or determined. In some embodiments, the DPF profile is determined as a function of changes in temperature and relative humidity over a period of time and corresponding to the irrigation location. The period of time typically corresponds with or at least overlaps some of the period of time considered in evaluating and/or obtaining the BP profile. In some embodiments, the period of time considered in evaluating the DPF profile matches the period of time considered in evaluating the BP profile. Additionally or alternatively, in some implementations, the sampling interval and/or rate of samples used in determining the DPF profile match the interval and rate of samples used in determining the BP profile. In some embodiments, the DPF profile corresponds to a temperature profile of changes in temperature over the period, and a relative humidity profile of changes in relative humidity over the period. In other embodiments, the DPF profile corresponds to a dew point differential (DPD) profile over the period of time, where the DPD is proportional to changes over the period of time of the difference between current actual temperature and a dew point temperature. For example, in some implementations, the rain prediction system 114 receives temperature data and relative humidity data. A current DPD is calculated, in some embodiments, by calculating the current dew point temperature using measured temperature and relative humidity data, then subtracting the dew point temperature from the current temperature, where the dew point is the temperature at which water vapor in air at constant barometric pressure condenses into liquid water at the same rate at which it evaporates. A series of DPDs are calculated over the period and stored, with the DPF profile comprising the series of DPDs calculated over at least the period of time.

In step 216, the rain prediction system 114 makes a determination of whether a rain event is likely to occur as a function of both the BP profile and the DPF profile. By considering both the BP profile and the DPF profile in predicting whether a rain event is likely to occur in the future, the accuracy of the prediction is increased. Further, the consideration of the BP profile and the DPF profile over the period of time allows the rain prediction system to anticipate when environmental conditions will correspond to a likely rain event. Additionally, the rate of change of the BP profile and/or the DPF profile can be used, in some embodiments, for predicting a time in the future when the rain is expected. Some embodiments take into consideration a slope of the change of one or both the BP profile and the DPF profile in predicting when weather conditions are consistent with rain events occurring, and identify an approximate time a rain event is predicted to occur as a function of the identified slope of the at least one of the BP profile and the DPF profile. Still further, in some implementations, the rain prediction system further takes into consideration a current BP value and/or current DPF value in predicting whether a rain event is likely to occur.

In step 218, a control signal is generated based on the determination that the rain event is likely to occur. The control signal is configured to cause one or both of a current and scheduled irrigation to be limited. By applying adjustments in advance of the actual rain event based on the BP profile and the DPF profile, significant cost savings and reduced water waste can be achieved by allowing the rain to water the plant instead of through irrigation.

Figure 3:
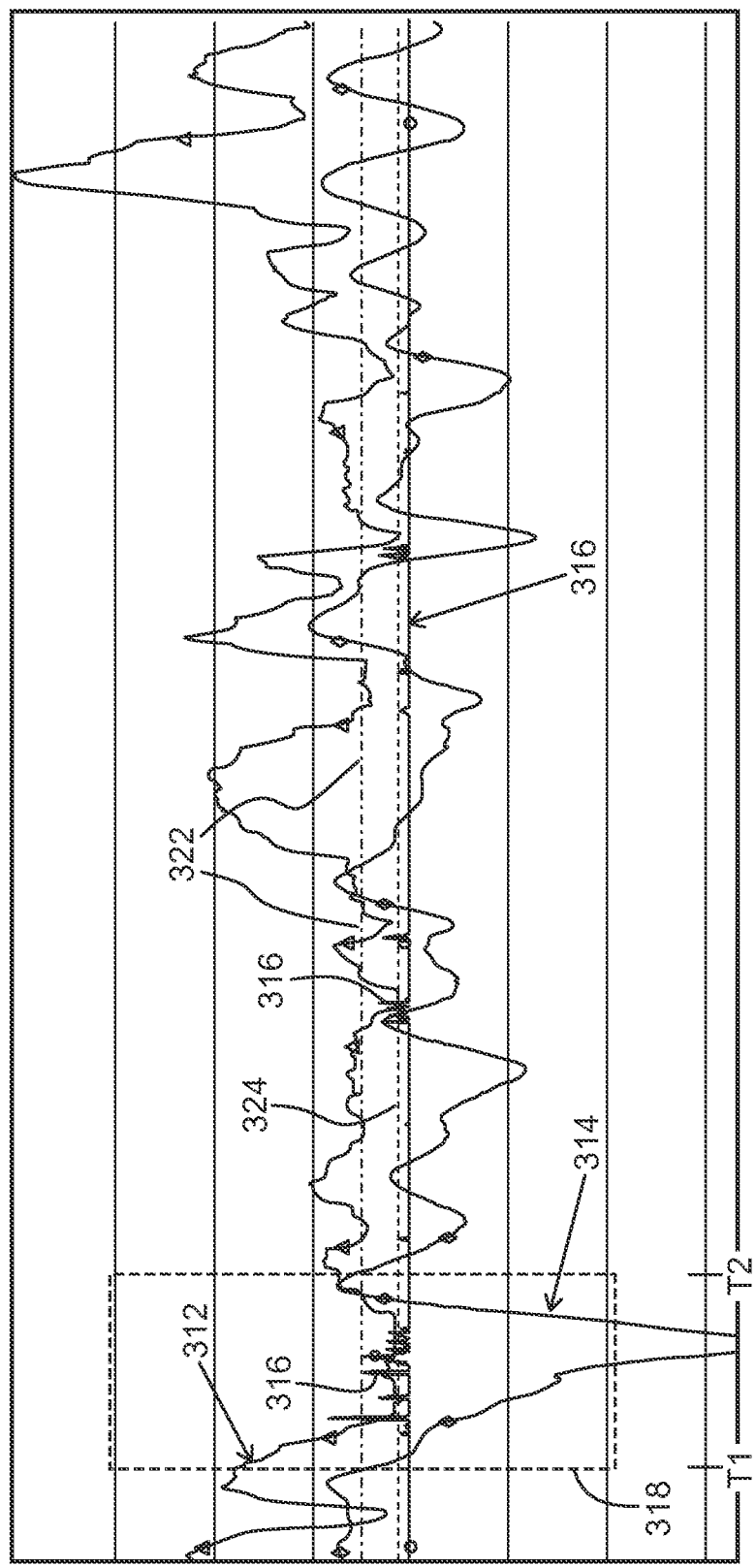
FIG. 3 shows a graphical representation of an exemplary DPF profile and an exemplary BP profile over time, while also showing a precipitation or rain line over that time.
Figure 4:
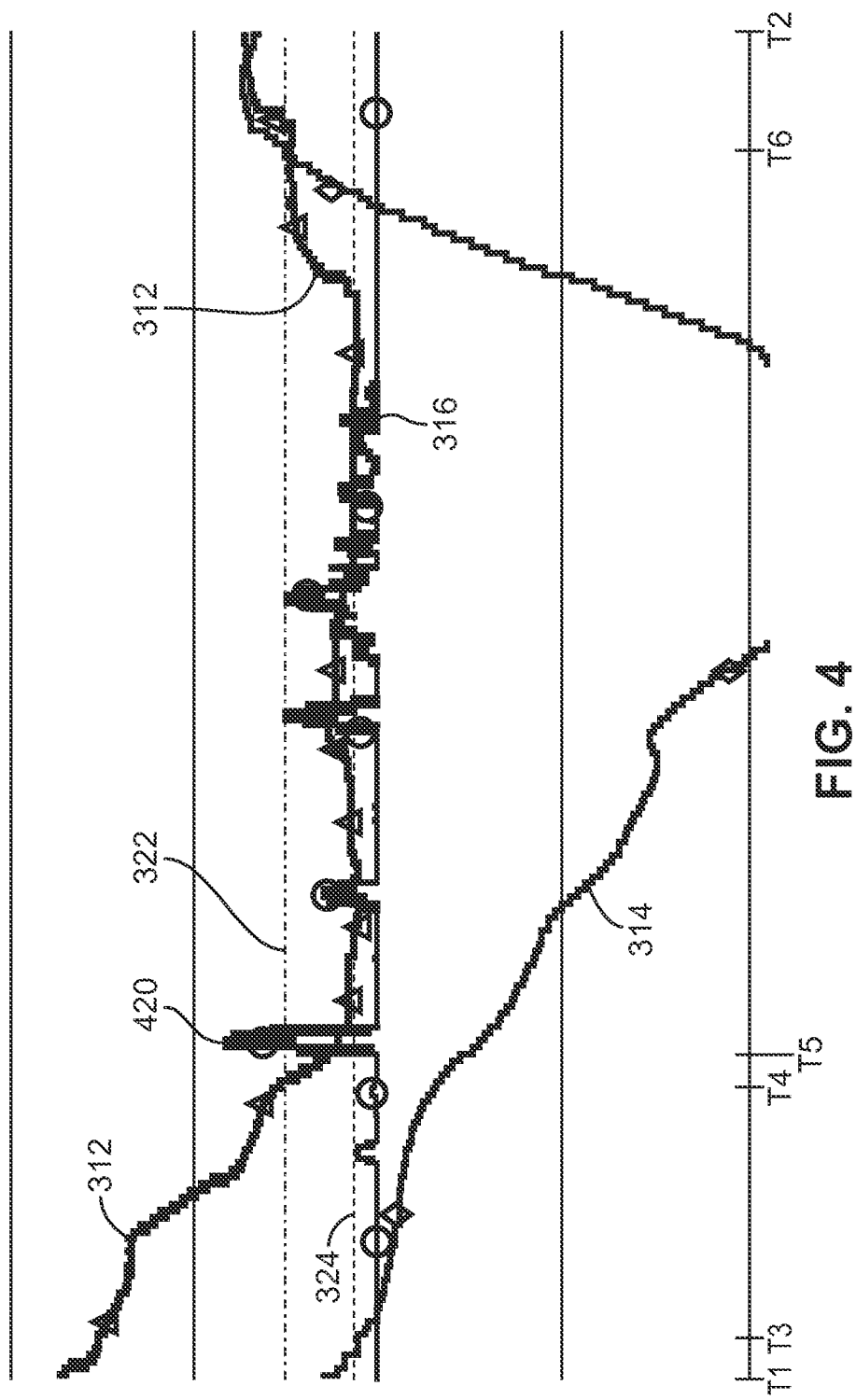
FIG. 4 shows an enlarged view of a portion of the graphical representation depicted in FIG. 3.

FIG. 3 shows a graphical representation of an exemplary DPF profile 312 and an exemplary BP profile 314 over time (e.g., over a year or more), while also showing a precipitation or rain line 316 over that time. FIG. 4 shows an enlarged view of the portion of the graphical representation depicted in FIG. 3 identified by the dashed box 318, and also showing the DPF profile 312, the BP profile 314 and the rain line 316 over a given period of time from T1 to T2. Through an evaluation of both the DPF profile 312 and the BP profile 314, the rain prediction system 114 is configured to predict whether a rain event is likely to occur.

Referring to FIGS. 3-4, in some embodiments, the evaluation in determining whether a rain event is likely takes into consideration the DPF profile and/or a current dew point differential (DPD) relative to a DPF reference threshold 322, and the BP profile and/or a current BP relative to a BP reference threshold 324. In many instances, a rain event is expected when a current BP is below the BP reference threshold and a current DPD is below the DPF reference threshold. Accordingly, in some instances, the rain prediction system predicts that a rain event is likely to occur when both the current BP is below the BP reference threshold 324 and a current DPD is below the DPF reference threshold 322. As can be seen in FIG. 4, at time T3 the BP profile 314 crosses and drops below the BP reference threshold 324, and at time T4 the DPF profile 312 crosses and drops below the DPF reference threshold 322 with a rain event 420 occurring at time T5, a relatively short duration following both the BP profile and the DPF profile being below the BP reference threshold 324 and the DPF reference threshold 322, respectively. Between times T5 and time T6 numerous rain events occur while both the BP profile and the DPF profile are below their respective reference thresholds.

In many instances, however, rain events may be predicted as likely to occur prior to the BP profile and the DPF profile crossing their respective reference thresholds. For example, a determination that a rain event at time T5 is likely to occur may be made prior to time T4 when both the DPF profile and the BP profile are below their respective reference thresholds. Based on this predicted rain event, irrigation runtimes over one or more days may be limited and/or adjusted in advance of time T5 and allowing the rain to compensate for the amount of water not applied during the limited irrigation runtimes.

As described above with reference to FIG. 2, in step 218 a control signal can be generated based on the determination that the rain event is likely to occur causing one or both of a current and scheduled irrigation to be limited and/or adjusted. The limiting of the current and/or scheduled irrigation can include reducing runtimes, suspending irrigation, interrupting irrigation, or other such limits. For example, in some embodiments, the control signal can comprise a correction factor configured to be applied in adjusting one or more current and/or scheduled irrigation runtimes. In some embodiments, the correction factor comprises a percentage adjustment configured to cause the irrigation runtimes to be adjusted proportionally to the percentage adjustment. For example, the correction factor may dictate a 15% adjustment, a 30% adjustment or other such adjustments. Similarly, the correction factor may dictate a 100% adjustment effectively suspending or interrupting irrigation for one or more irrigation runtimes, cycles and/or days.

In some embodiments, the determination of the correction factor is dependent on a threshold depletion level or minimum water level of the plant life. In many instances, the correction factor is calculated with attempts to avoid water levels of the plant life from dropping below the threshold depletion level because below such levels damage may occur to the plant life. Accordingly, in some implementations, the rain prediction system 114 in determining a correction factor may avoid suspending irrigation so that it ensures the water levels of the plant life do not drop below threshold levels even when a rain event is predicted. Accordingly, the correction factor may be specified so that approximately a minimum amount of water is irrigated in attempts to avoid water levels dropping below the threshold depletion levels. For example, a rain event may be predicted with a high degree of confidence, however, because irrigation has not been scheduled for several days, the rain prediction system 114 may issue a correction factor that is less than 100% so that at least some water is irrigated in attempts to avoid water levels dropping below one or more threshold depletion levels. Additionally or alternatively, the irrigation controller 112 may modify one or more correction factors in similar attempts to avoid water levels dropping below the threshold depletion levels.

Further, in some embodiments, the irrigation controller applies the correction factor (or an adjusted correction factor as described below) through an existing seasonal adjust feature of the irrigation controller that allows the irrigation controller to adjust irrigation schedules based on a percentage adjustment. Many irrigation controllers provide a seasonal adjust feature allowing a user to set irrigation runtimes and then apply a percentage adjustment to compensate for a current time of year (e.g., set runtimes for the hottest month, then apply seasonal adjust percentages over other months to reduce runtimes). In some embodiments, when there is a seasonal adjustment is already defined for a current time, the seasonal adjust is used in cooperation with the correction factor (e g, summing the seasonal adjust and the correction factor, a ratio may be calculated, or other such cooperation). Typically, however, the seasonal adjust and the correction factor are independent of each other, and one can be applied independent of the other.

Further, some irrigation systems define and/or adjust irrigation runtimes based on a calculated ET. The application of adjustments to irrigation runtimes based on the calculated ET may be applied with some irrigation controllers by redefining irrigation runtimes each time an ET is calculated. In other irrigation controllers, an adjustment to irrigation runtimes based on a determined ET may be applied through the seasonal adjust feature. This ET defined runtimes and/or adjustments through the use of the seasonal adjust feature can be applied independent of and in addition to adjustments applied based on the correction factor also using the seasonal adjust feature. The adjustment of irrigation based on a predicted rain event, in some embodiments, attempts to throttle back scheduled runtimes, which may or may not have already been corrected based on ET, seasonal adjustments and/or other relevant adjustments. As such, in some embodiments, the correction factors determined as a function of a predicted rain event are applied independent of other adjustments and/or runtimes that may be determined as a function of ET or other such factors. By considering the currently available scheduled watering time (whether calculated and/or pre-adjusted by one or more other methods or not), the adjustment to irrigation runtimes applied based on a correction factor determined based on a predicted rain event is independent of other schedule corrections.

Still referring to FIGS. 3-4, the prediction that a rain event is likely to occur can depend on one or more factors, such as but not limited to a relationship between the BP profile 314 and the BP reference threshold 324 at a given time and/or over a range of one or more times, a relationship between the DPF profile 312 and the DPF reference threshold 322 at a given time and/or over a range of one or more times, a rate of change of the DPF over time, a rate of change of the BP over time, a slope of the DPF profile, a slope of the BP profile, and other such factors or combinations of such factors. Further, the slope can be used at least in part to extrapolate when in time the BP value and/or the DPF value is expected to equal or cross their respective reference thresholds. For example, a rain event may be predicted when one of the BP profile and the DPF profile is below their respective threshold, while the other of the BP profile and the DPF profile is dropping with a slope that exceeds a slope threshold and approaching the corresponding reference threshold. By predicting in advance, the amount of water delivered through irrigation can be reduced allowing the subsequently predicted rain to provide the water that was not provided as the result of the reduced irrigation. In some embodiments, the control signal dictates greater reductions in the amounts of water irrigated as the confidence level that the rain event is likely to occur increases.

Figure 5A:
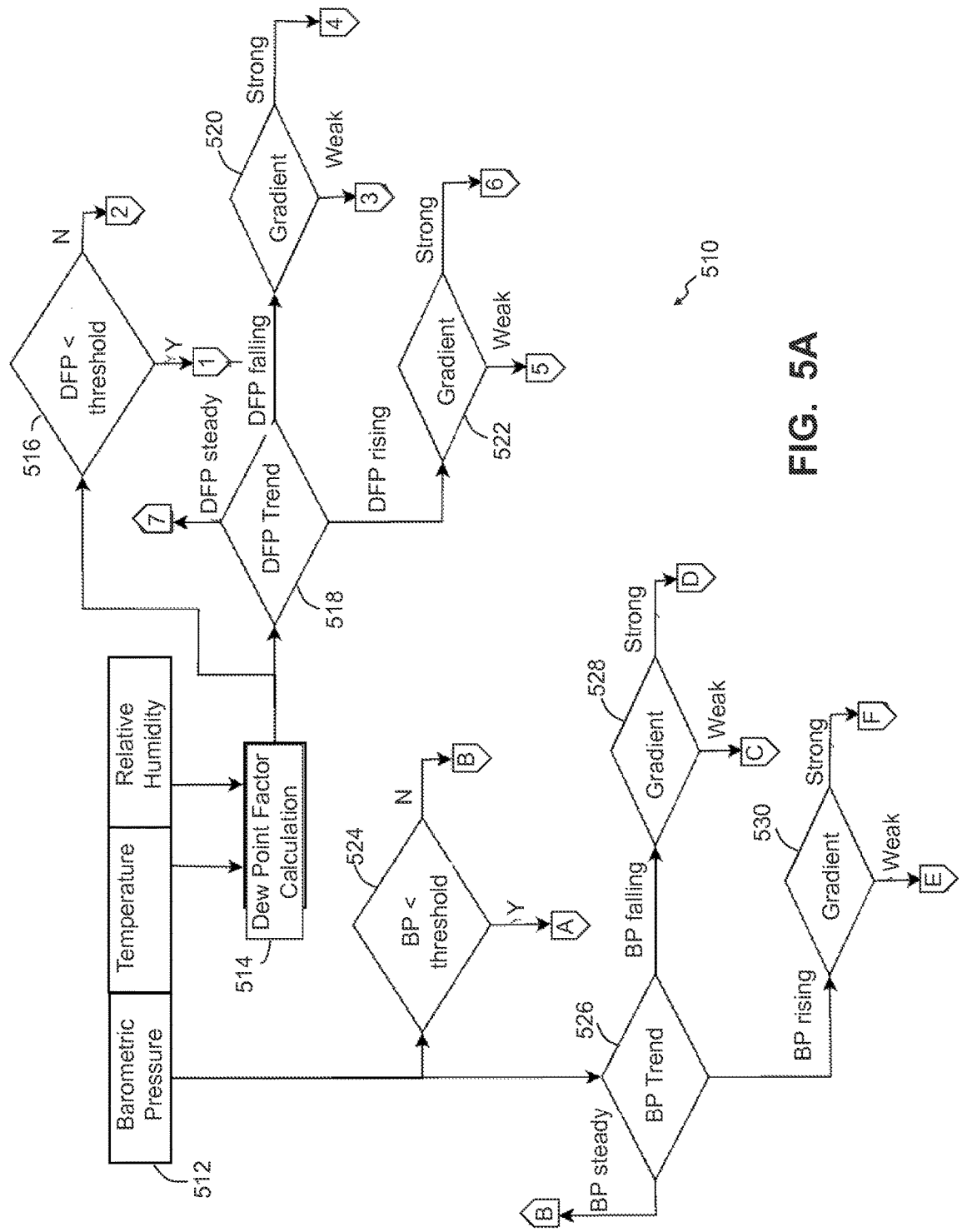
FIG. 5A depicts an exemplary flow diagram of a process of making a determination of whether a rain event is likely, in accordance with some embodiments.

FIGS. 5A-5H depict an exemplary flow diagram of a process 510 of making a determination of whether a rain event is likely, in accordance with some embodiments. The process in FIG. 5A illustrates exemplary steps of evaluating sensor data, while FIGS. 5B-5H illustrate exemplary logic and/or steps applied in determining a likelihood of a rain event. Referring to FIG. 5A, in step 512, sensor data and/or information is received. Again, the sensor data may be received from local sensors 116, obtained from one or more remote sensors (e.g., sensor information that are intended for use of a wide area, such as a city), obtained from a remote source accessed over a distributed network (e.g., a WAN, Internet, etc.), and/or other such sources or combinations of such sources. For example, the sensor data may include barometric pressure data, temperature data, relative humidity data and/or other such information. Further, the data may be received periodically, continuously, or based on a schedule (e.g., sensor data may be received multiple times each hour, hourly, multiple times daily, once daily, or the like). Additionally or alternatively, the sensor data may be received in response to changes detected, such as changes that exceed change thresholds (e.g., change in BP that is greater than a BP change threshold).

In step 514, a current DPF value is determined. As introduced above, in some embodiments, a DPF value is determined as a function of a current temperature and the relative humidity and in some instances is at least based on a difference of dew point temperature and current temperature (and may be referred to as the Dew Point Differential (DPD)). In step 516, the current DPF value is evaluated relative to the DPF reference threshold 322. For example, a determination is made whether the current DPF value is at or has crossed the DPF reference threshold. In step 518, the DPF profile is evaluated to determine a rate of change of the DPF over time (e.g., determine whether the DPF profile is relatively stead, is generally falling, is generally rising, etc.). It is noted that DPD measurements may potentially be collected at a different rate than BP measurements. Further, the rate of evaluation of the BP profile and/or the DPF profile may vary. For example, the BP profile and the DPF profile may be evaluated less frequently when the current BP value and/or current DPF value are substantially higher than their respective threshold values (and so a potential rain event is predicted to be far enough away not to warrant preemptive schedule correction during the longer evaluation time periods or frames).

In step 520, the gradient or slope of the falling DPF profile is evaluated to determine whether the rate of change is relatively strong, has a medium gradient, is relatively weak, there is relatively no change or is flat, or other such determinations. Similarly, in step 522 the gradient or slope of the rising DPF profile is evaluated to determine whether the rate of change is relatively strong, medium, relatively weak, consistent, etc. In some embodiments, the slope of the BP profile and the slope of the DPF profile are evaluated relative to one or more BP slope thresholds and DPF slope thresholds, respectively. For example, when identifying that a rain event is likely, the process can identify that at least one of the slope of the BP profile and the slope of the DPF profile is decreasing at a rate that has a predetermined relationship with a first slope threshold, while the other of the slope of the BP profile and the slope of the DPF profile is not increasing at a rate that has a predetermined relationship with a second slope threshold. Some embodiments determine whether the BP profile has a predetermined relationship with a threshold rate of change of the BP and/or whether the DPF profile has a predetermined relationship with a threshold rate of change of the DPF. The determined trend (e.g., weak, medium, and strong) may be defined by trend or slope thresholds. Further the trends and/or the slope thresholds may be fixed (e.g., by the manufacturer, fixed based on location, etc.), or may be determined based on observed historical data and cross-correlation with associated weather events (e.g., strength of low pressure systems). Typically, the slope thresholds are independent of factors such as time of years, etc. Some embodiments may apply some minor adjustments over time, for example, after long-term rain predictor performance evaluations.

In step 524, a current BP value is evaluated relative to the BP reference threshold. For example, a determination is made whether the current BP value is at or has crossed the BP reference threshold. In step 526, the BP profile is evaluated to determine a rate of change of the BP over time (e.g., whether the BP profile is relatively stead, is generally falling, is generally rising). Again, the duration that is considered in evaluating the BP profile over time can be a fixed period of time, or can vary depending on one or more factors, which may be similar to or different than the factors in varying the time period in evaluating the DPF profile. In step 528, the gradient or slope of the falling BP profile is evaluated to determine whether the rate of change is relatively strong, medium, relatively weak, consistent, etc. Similarly, in step 530 the gradient or slope of the rising BP profile is evaluated to determine whether the rate of change is relatively strong, medium, relatively weak, consistent, etc.

Figures 5B, 5C:
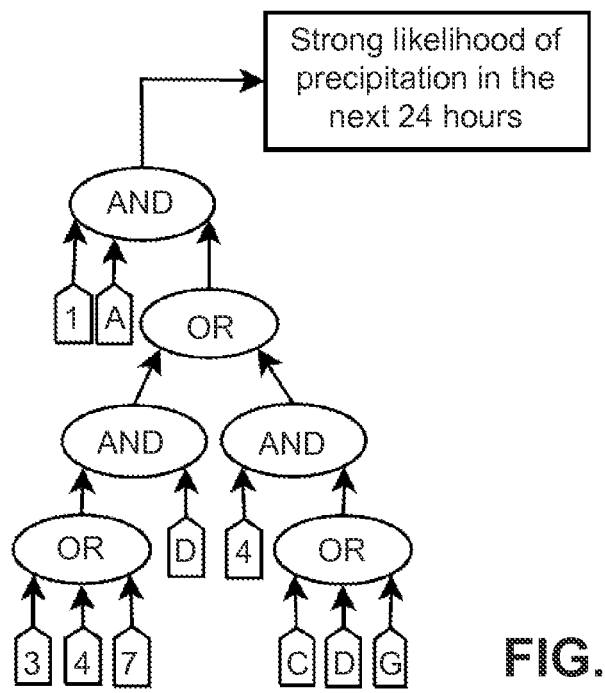
FIGS. 5B-5H show exemplary logic, in accordance with some embodiments, applied in determining whether a rain event is likely.

The prediction of whether a rain event is likely to occur is dependent on both the DPF profile and the BP profile. Further, in many embodiments, the prediction is depending on whether the current DPF value and/or the current BP value are at or below their respective reference thresholds. For example, as seen in FIG. 5B exemplary logic, in accordance with some embodiments, is applied in evaluating at least the BP profile and the DPF profile, and making a determination that there is a strong likelihood of a rain event generally when both the current BP value and the current DPF value are at or below their respective reference thresholds, and the slopes of at least one of the BP profile and the DPF profile is strongly trending down (steep gradient) while the other of the BP profile and the DPF profile is trending down or at least not trending up. The timing of the predicted rain event can depend on one or more factors, such as but not limited to the current BP value relative to the BP reference threshold, the current DPF value relative to the DPF reference threshold, the slope of the BP profile and/or the slope of the DPF profile, other such factors or combinations of such factors. For example, the slope of the DPF profile and/or the BP profile can be extended to predict when in time one or both of a current DPF value and a current BP value reaches or is below their respective reference thresholds. Further the consistency of the slope and/or the steepness of the slope may further factor into a degree of anticipated accuracy of the predicted rain event and/or the predicted timing of the expected rain event. Furthermore, the confidence levels of predication rain events can be dependent on the slope of one or both the BP profile and the DPF profile. For example, in some embodiments as the slope of one or both of the BP profile and the DPF profile increases in a decreasing direction, typically the level of confidence in the prediction of a rain event increases. Trend determination is also typically considered over a period of time, and some embodiments average out periodic variations. For example, DPD values often are seen with about a 24 hour oscillation cycle that corresponds to daily temperature variations. Accordingly, some embodiments utilize a 24 hour lagging average as an averaging interval.

Time estimates for the occurrence of a rain event typically vary with current environmental conditions. Predicted timing of a rain event, however, is often determined as a function of a difference or distance between the BP threshold and a current BP value and/or a difference between a DPF threshold and a current DPF value. Some embodiments provide long term timing estimates and short term timing estimates (e.g., longer term is predicted when a current BP value and/or a current DPF value is above their respective thresholds, with the time estimate of a rain even prediction corresponding to an interval of the BP profile and/or DPF profile crossing their respective threshold values at a current downward trend; and short term prediction when the current BP value and current DPF value being below their threshold values, with precipitation predicted as likely as soon as the BP profile and DPD profile trends are favorable). Additionally or alternatively, some embodiments extrapolate time of threshold crossings and/or favorable trends to determine estimated times of a rain event.

Figure 5D:
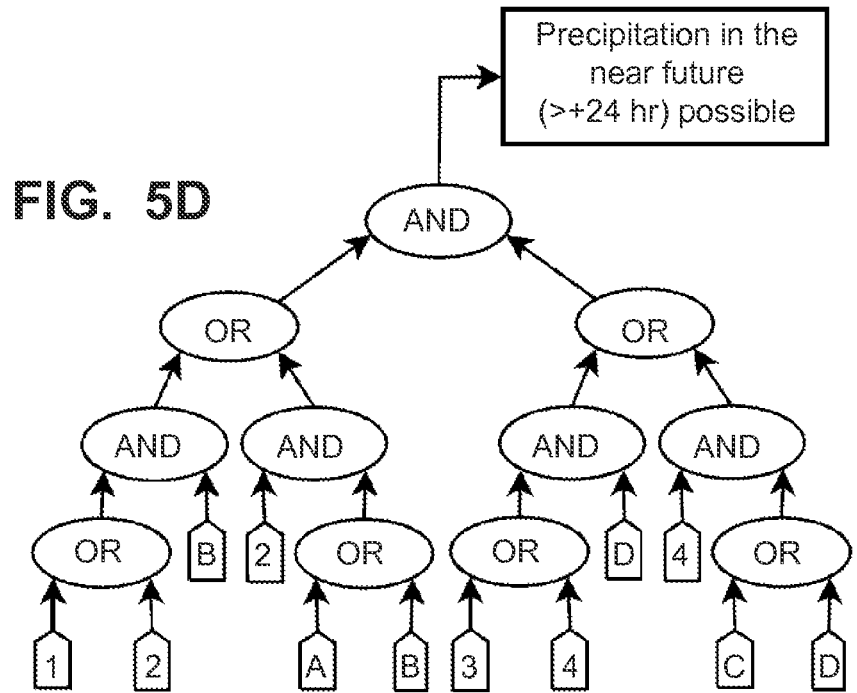

FIG. 5C similarly shows exemplary logic, in accordance with some embodiments, applied in evaluating at least the BP profile and the DPF profile. In this example, the logic determines that it is likely a rain event will occur when the current BP value and the current DPF value are at or below their respective reference thresholds, and at least one of the BP profile and the DPF profile are relatively weakly trending down (e.g., the slope is less than a strong likelihood slope threshold) while the other of the BP profile and the DPF profile is at least stable or trending lower at a relatively weak gradient. FIG. 5D shows exemplary logic, in accordance with some embodiments, applied in determining that there is a possibility in the near future (e.g., within less than 24 hours) that a rain event will occur when at least one of a current BP value and a current DPF value is above its respective reference threshold, and both the BP profile and the DPF profile is rending down while the slope of at least one of the BP profile and the DPF profile is relatively steeply or strongly trending down.

Figure 5E:
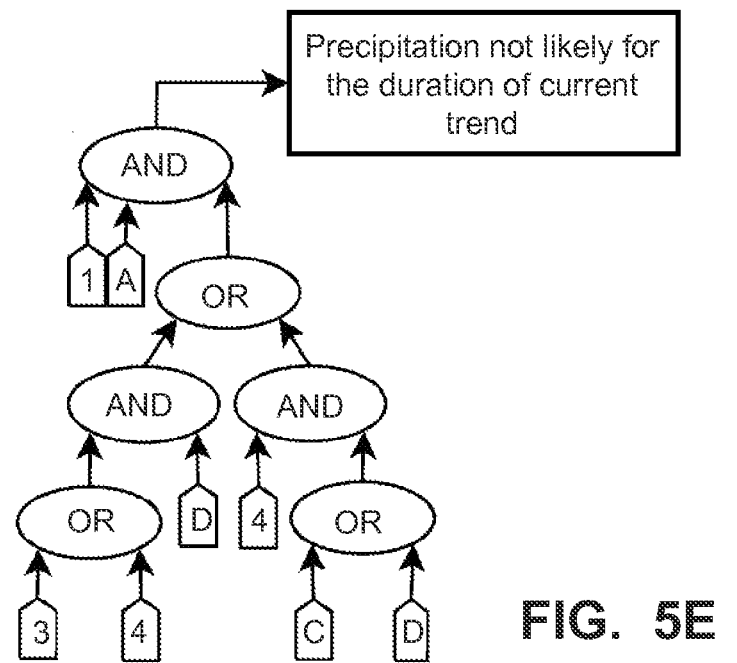

FIG. 5E shows exemplary logic, in accordance with some embodiments, applied in determining that a rain event is not likely occur within a given period of time based on current trends. Such a determination may be made, for example, when the current trends include at least one of a current BP value and/or a current DPF value are below their respective thresholds while the slope of one or both of the BP profile and the DPF profile is relatively strongly trending upward. The given period of time where a rain event is not predicted may vary depending on one or more factors, such as the slope of one or both of the BP profile and the DPF profile, the proximity of the current BP value and/or a current DPF value relative to their respective reference thresholds and/or other such factors or combinations of such factors.

Figure 5F:
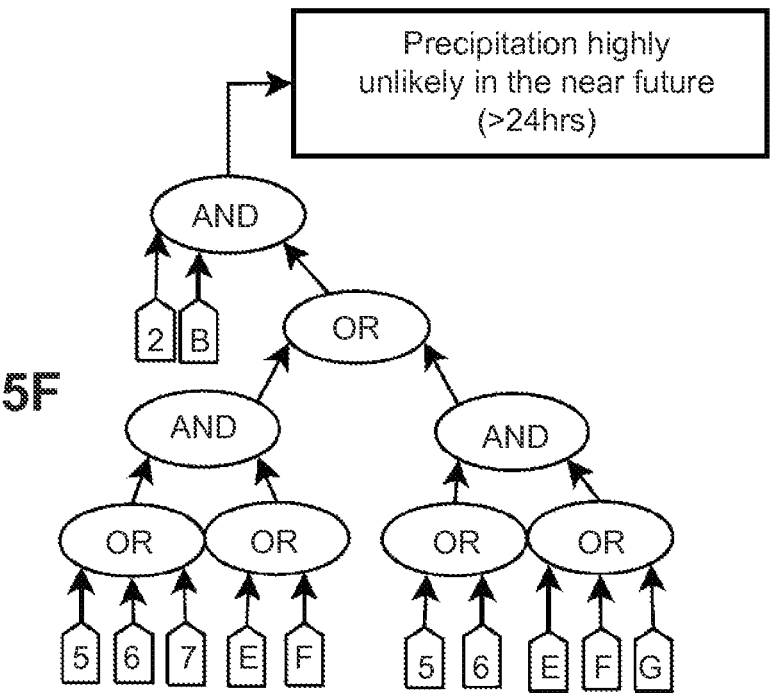

FIG. 5F shows exemplary logic, in accordance with some embodiments, applied in determining that a rain event is highly unlikely to occur within the relatively near future (e.g., less than 24 hours). For example, a rain event is predicted as highly unlikely, in some implementations, when both the current BP value and the current DPF value are above their respective reference thresholds, and at least one of the BP profile and the DPF profile is trending higher while the other of the BP profile and the DPF profile is at least not trending lower.

Figure 5G:
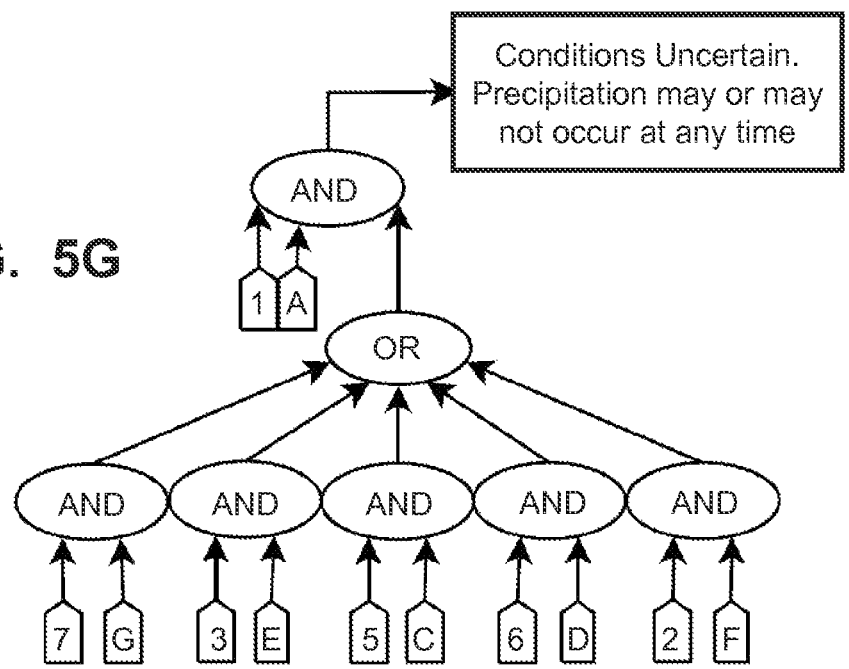
Figure 5H:
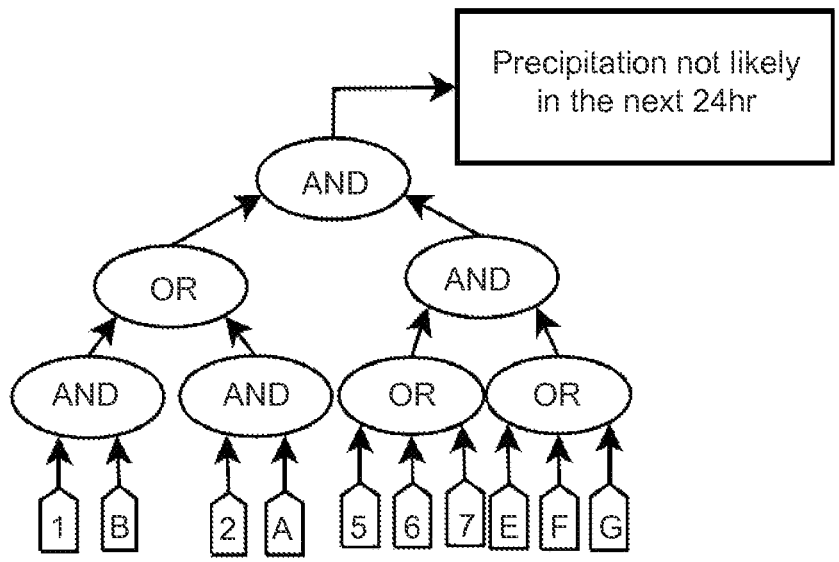

FIG. 5G shows exemplary logic, in accordance with some embodiments, applied in determining that conditions are uncertain regarding whether a rain event is likely or unlikely to occur. For example, in some implementations, a rain event is not accurately predictable when both the current BP value and the current DPF value are below their respective reference thresholds, while the BP profile and the DPF profile are relatively level or stagnant, or one of the BP profile and the DPF profile is trending lower while the other is trending higher and typically at a similar slope or rate. In response to such a prediction, in many embodiments, no correction factor is transmitted or a correction factor with a 0% correction factor (or relatively small correction factor) is communicated. FIG. 5H shows exemplary logic, in accordance with some embodiments, applied in determining that a rain event is unlikely to occur within the relatively near future (e.g., less than 24 hours). For example, at least one of the current BP value and the current DPF value is above their respective reference thresholds, while neither the BP profile and the DPF profile is trending lower. Again FIGS. 5A-5H are examples of a process and logic applied in predicting whether a rain event is likely to occur. Other processing and/or logic may additionally or alternatively be applied in some embodiments.

As described above, in response to making a determination that a rain event is likely, some embodiments generate a correction factor that may limit irrigation of one or both current and future irrigation schedules and/or runtimes. Further, the amount of correction applied can vary. In some embodiments, the amount of correction applied by the correction factor depends on a degree of certainty and/or a confidence level that the predicted rain event is likely to occur. In some implementations, the correction factor can be determined as a function of one or more of a relationship of the slope of one or both of the BP and DPF profiles relative to one or more slope thresholds and/or the corresponding reference thresholds, a relationship between one or both of a current BP value and a current DPF value and their corresponding reference thresholds, an amount of time until the rain event is predicted to occur, a time when irrigation is expected to occur, whether irrigation is expected to occur prior to reaching a threshold depletion level within plant life being irrigated, or other such factors or combinations of such factors. For example, in some instances a value of a correction factor may be proportional to at least one of the slope of the BP profile and the slope of the DPF profile. Further, some embodiments may take into consideration wind measurements in predicting rain events. For example, wind measurements can be used to increase confidence in rain event prediction, which can, in turn, affect the irrigation correction factor.

Further, in some embodiments, correction factors may be defined to be applied over multiple irrigation cycles such that a cumulative effect of multiple correction factors results in a desired total correction factor. Similarly, the determination of a current correction factor may be dependent on previous correction factors generated in anticipation of a single predicted rain event and/or correction factors issued since a last irrigation event. For example, a first correction factor may be generated on a first day based on a rain event predicted to occur the next day, and the determination and/or calculation of a second correction factor generated on the next day can take into account the first correction factor and/or the expected reduced amount of water applied based on the first correction factor. In some embodiments, the rain prediction system may calculate and/or weight a correction factor based in part on a frequency of irrigation days, time since last irrigation, previous correction factors, other such factors, or combination of such factors. Still further, in some embodiments, the rain prediction system 114 receives feedback information from the irrigation controller (e.g., last irrigation day, estimated amounts of water applied, predicted threshold levels, etc.) that can be used in determining a correction factor. Some embodiments attempt to maximize the effect of a rain event by applying one or more correction factors in an attempt to maximum an allowable watering deficit at a time the precipitation occurs without damaging plants being irrigated. In some instances, this deficit can be created immediately (e.g., by stopping irrigation until it is reached, then watering enough to avoid further deficit increases), or gradually.

The irrigation controller 112 uses the one or more correction factors in adjusting the current and/or scheduled irrigation runtimes. In some embodiments, one or more correction factors are communicated from the rain prediction system 114 to the irrigation controller 112. Further, in many instances, an irrigation controller does not irrigate each day or does not irrigate through each irrigation valve (or station) every day. In some embodiments, the rain prediction system 114, however, is configured to generate correction factors daily or multiple correction factors per day. Accordingly, in some embodiments, the irrigation controller is configured to take into consideration multiple correction factors, such as correction factors for one or more previous days when irrigation was not implemented (e.g., because ET values do not reach threshold levels, scheduled non-irrigation day, etc.). For example, some embodiments receive and store correction factors on days where irrigation through one or more valves is not implemented. When irrigation is to occur (e.g., based on ET data, based on a scheduled watering day, etc.), the irrigation controller can determine an adjusted correction factor based on the one or more previous correction factors and any current correction factor.

Accordingly, in many embodiments, the rain prediction system 114 takes into account real-time outcomes of predicted rain events and factors this into overall schedule adjustments over a prediction-to-result time frame. Corrections to a subsequent watering time and/or cycle can, in some implementations, take into account current incremental water deficits (e.g., expressed through a most recent ET ratio or other such factor), current environmental trends/conditions (e.g., a notification of a predicted rain event, a calculation of a correction factor, expressed through a rain event anticipator confidence level, other such information or combination of such information), past schedule adjustments, rainfall information, and the like. As such, in some embodiments, the rain prediction system 114 and/or irrigation controller 112 keep track of past schedule corrections and factor these past corrections into current and/or future irrigation scheduling and/or corrections. In some implementations, the correction factor is adjusted to compensate for non-irrigation days and/or cycles, such as through an averaging of correction factors, summing correction factors, adjusting based on expected watering needs (e.g., based on current and/or previous ET values), or other such adjustments or combinations of such adjustments.

As described above, one or more correction factors and/or adjusted correction factors can be determined in an effort to decrease irrigation times so that a cumulative watering deficit reaches a maximum allowable at a time consistent with when the rain event is predicted to occur. This can balance water savings with high plant stress duration. In other implementations, one or more correction factors and/or adjusted correction factors are determined to effectively stop irrigation completely until the maximum watering deficit is reached, and then adjustment factors are determined to continue irrigating enough to avoid exceeding the maximum watering deficit until the time rain is anticipated. This can maximize water savings and plant stress.

Further, in some embodiments, the rain prediction system 114 is configured to generate appropriate schedule correction factors and/or adjusted correction factors (e.g., averages) for one or more irrigation programs and/or schedules, even in the absence of irrigation schedule information exchange between the rain prediction system 114 and an irrigation controller 112. The rain prediction system, in some embodiments, stores one or more correction factors and/or adjusted correction factors. For example, the rain prediction system can be configured to store a rolling and/or average adjusted correction factor in a buffer that can be passed along to the irrigation controller 112 (e.g., every time a new correction factor is generated, in response to a request from the irrigation controller, based on a scheduling, etc.). In other embodiments, the rain prediction system 114 forwards correction factors and the irrigation controller stores correction factors and/or calculates adjusted correction factors, which may be a global adjusted correction factor for the irrigation controller, or different adjusted correction factors may be determined based on different irrigation programs and/or schedules (e.g., calculate an average correction factor for each program scheduled to water during a following day).

For example, the rain prediction system 114 is configured, in some embodiments, to maintain a rolling buffer of correction factors for multiple days (e.g., 3 days, 7 days, 30 days or some other number of days). Similarly, one or more corresponding confidence values may be maintained. Further, in some embodiments, the rain prediction system is further part of or used in cooperation with an ET calculation system configured to calculate ET values and/or ratio values that are supplied to the irrigation controller 112 to be used by the irrigation controller in determining whether irrigation is to be implemented and/or to calculate irrigation durations and/or runtimes. As specific example, the rain prediction system and/or ET system may store seven most recent daily correction factors, along with three most recent confidence values and three or more ET ratio values. The corresponding confidence values, ET ratios and daily correction factor values can be used by the irrigation controller 112 in the calculation of a current day's adjusted correction factor. In some instances, the irrigation controller uses the ET data to determine whether irrigation is to be implemented on a given day and corresponding runtimes for one or more stations, and the one or more correction factors (and when appropriate the one or more confidence levels) can be used to limit the irrigation runtimes determined based on the ET data.

Further, in some embodiments, recent actual rainfall measurements may be used to modify the adjusted correction factor and/or an adjustment factor may be applied in modifying an adjusted correction factor. The irrigation controller receives the one or more correction factors and/or adjusted correction factor to be used in determining irrigation runtimes. In some embodiments, the rain prediction system and/or ET system additionally communicates the confidence values and one or more ET ratio values when relevant. For example, the rain prediction system and/or ET system communicates the entire multi-day rolling correction factor buffer storing one or more correction factors and/or adjusted correction factors, confidence values and/or ET ratio values. Again, the information may be transmitted based on a schedule, upon calculation of a value or correction factor, in response to a request from the irrigation controller (e.g., daily, multiple times a day, etc.), or the like. The information is used by the irrigation controller in calculating and applying an appropriate correction factor average value for current and scheduled irrigation based on the determination that the rain event is likely to occur.

Many irrigation controllers operating in accordance with irrigation schedules and/or based on ET data typically have watering intervals that are defined weekly (i.e., based on 7 day cycles). Accordingly, in many embodiments, the rain prediction system 114 can be configured to store and provide up to seven (7) days of the correction factors, confidence values and/or ET ratio values, allowing an irrigation controller 112 to readily use the information in calculating and applying an appropriate correction factor average value for every programming option. It is noted that some irrigation controllers allow for cyclic scheduling that may extend beyond the typical 7 day period. Accordingly, in some embodiments, irrigation controllers are configured, for use with cyclic programming watering intervals longer than 7 days, to store the 7-day average and update it with subsequent daily readings. Similarly, because watering cycles vary among irrigation programs and within each irrigation program, some embodiments store rolling 2 day average, 3 day average, 4 day average, 5 day average, 6 day average, 7 day average, and/or cyclic average, while also keeping a current correction factor for daily schedules. These rolling values may be calculated at the rain prediction system 114, the irrigation controller 112, an ET system or other device.

It is noted that in some instances a predicted rain event may not occur. Similarly, because the correction factors are applied in anticipation of rain events to reduce the amount of water applied through irrigation, the actual amount of rain received from a rain event may be insufficient to compensate for the amount of water that was not applied through irrigation based on the correction factors. As such, the application of one or more correction factors in anticipation of a rain event may result in insufficient amounts of water having been applied to plant life. Accordingly, some embodiments determine whether a predicted rain actually did occur and/or track an amount of rain that is received for a predicted rain event to determine whether a sufficient amount of rain was received and/or to determine whether subsequent irrigation should be adjusted to compensate for the amount of water not irrigated based on correction factors and that was not received through a predicted rain event.

Figure 6:
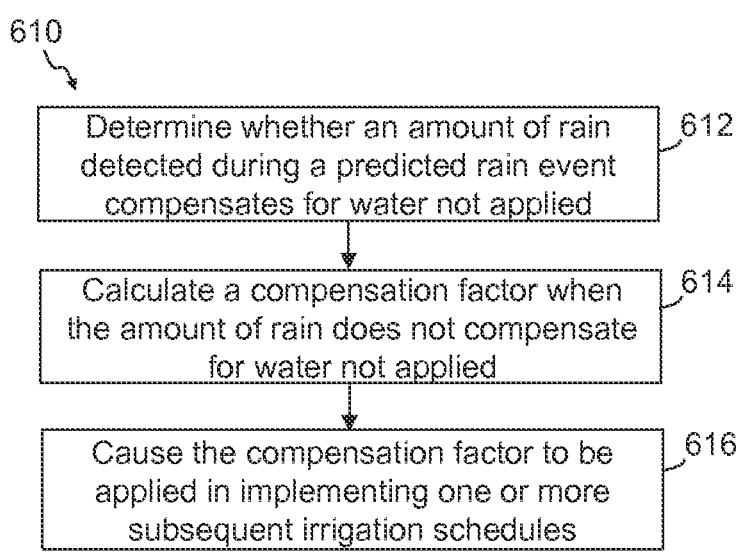
FIG. 6 shows a simplified flow diagram of an exemplary process of compensating for rain that was not received or was less than an amount of water not delivered through irrigation in anticipation of a predicted rain event, in accordance with some embodiments.

FIG. 6 shows a simplified flow diagram of an exemplary process 610 of compensating for rain that was not received or was less than an amount of water not delivered through irrigation in anticipation of a predicted rain event, in accordance with some embodiments. In step 612, it is determined whether rain was received and/or an amount of rain received that corresponds to a predicted rain event or events is evaluated to determine whether the amount of rain received is sufficient to compensate for an estimated amount of water that was not applied through irrigation because of the application of one or more correction factors. Again, the application of the correction factor typically causes at least a reduction in an amount of water applied during one or more irrigation cycles, and often results in a suspension of irrigation for one or more cycles. Accordingly, by applying the one or more correction factors the irrigation controller 112 reduces an amount of water applied through irrigation to plant life. One or more rain sensors 116 can communicate with the rain prediction system 114 and/or irrigation controller to provide sensed information corresponding to an amount of rain and/or other moisture detected through the sensor. Based on the actual amount of rain detected, the rain prediction system 114 and/or the irrigation controller can determine whether a rain event occurred or whether an amount of rain detected during a rain event compensates for water not applied as a result of limiting one or both of the current and the scheduled irrigation based on one or more correction factors generated in response to a predicted rain event.

In step 614, a compensation factor is calculated when rain is not sensed or the sensed amount of rain is determined to be less than the amount of water that was not delivered to plant life through irrigation based on the one or more correction factors. In some embodiments, the compensation factor is similar to the correction factor providing a percentage adjustment, but causes the irrigation controller to increase runtimes of current and/or scheduled irrigation. Further, the determination of whether a sufficient amount of rain is received may be evaluate relative to a threshold and/or whether the amount of rain received is within a threshold amount to the amount of water predicted as not having been applied based on the one or more correction factors. Furthermore, the value of the compensation factor can vary depending on how quickly to correct for deficiencies, whether further rain is predicted, etc. For example, some embodiments consider external constraints, such as whether maximum watering deficit can be maintained for the target period with acceptable negative impacts (crop size, plant stress, etc.), when determining a compensation factor.

In step 616, the compensation factor is forwarded to the irrigation controller 112 and/or applied by the irrigation controller in adjusting irrigation runtimes for one or more cycles of irrigation. In some embodiments, compensation is applied through a single irrigation cycle. In other embodiments, the compensation factor may be distributed over one or more irrigation cycles and/or irrigation days. For example, in some implementations, there may be watering restricts (e.g., government imposed) that limit an amount of water that can be applied on a given day and/or for a given valve. Accordingly, the compensation factor when applied in once cycle may cause runtimes to exceed the watering restriction. As such, the irrigation controller and/or the rain prediction system may distribute the compensation factor over one or more irrigation cycles and/or days to avoid exceeding the watering restrictions.

Similarly, the application of an entire compensation factor may result in a runtime for one or more valves that would cause some or even a large majority of the water to be ineffectively received by plant life (e.g., wasted due to run off or other such factors) and/or may cause overwatering. As such, some embodiments distribute the compensation factor over one or more cycles and/or increase a number of irrigation cycles and/or irrigation days in order to effectively apply the additional water to compensate for the water that was not received through the predicted rain event.

The rain event predictor cannot estimate the amount of precipitation expected, so the ideal correction factor application results in maximum water depletion at the time of the predicted rain event. Implementation may vary, in order to achieve the desired balance between water savings and plant stress (which is maximized at maximum water depletion), etc.

In some embodiments, the irrigation controller or a rain prediction system tracks a cumulative adjustment applied to the irrigation schedule during a current correction cycle. If insufficient or no rain is received, the irrigation schedule corrections applied in anticipation of a rain event can be reversed. Again, the procedure and number of irrigation events impacted to correct the deficiency may depend on external constraints, such as upward limitations on watering time that may exist, imposed by soil conditions and/or other such factors. Similarly, the correction factor distribution can be determined at either the irrigation controller or a rain prediction system.

Some embodiments further consider whether a subsequent rain event is predicted in determining whether to apply a compensation factor and/or how to distribute the application of a compensation factor over one or more cycles or days. In some embodiments, an irrigation deficit continues to be maintained when a subsequent rain event is predicted. Further, some embodiments take into consideration a predicted time frame in which the next rain event is expected, as well as upon the chosen approach. As one example, assume that both a current BP value and a current DPF value are below respective thresholds, but current trends do not favor precipitation, an irrigation deficit may be maintained throughout this period given that precipitation can occur relatively quickly after trends become favorable again.

Some embodiments are further configured to evaluate and/or adjust reference thresholds to enhance the accuracy of predicting when rain events are likely to occur. This evaluation can take into consideration the accuracy of the predictions, when rain events occur relative to BP values, DPF values, DPD values and/or other relevant parameters relative to predicted rain events and/or when rain is actually received. Similarly, the evaluation of the reference thresholds may take into consideration timing relative to when rain is predicted and when rain actually is detected.

Figure 7:
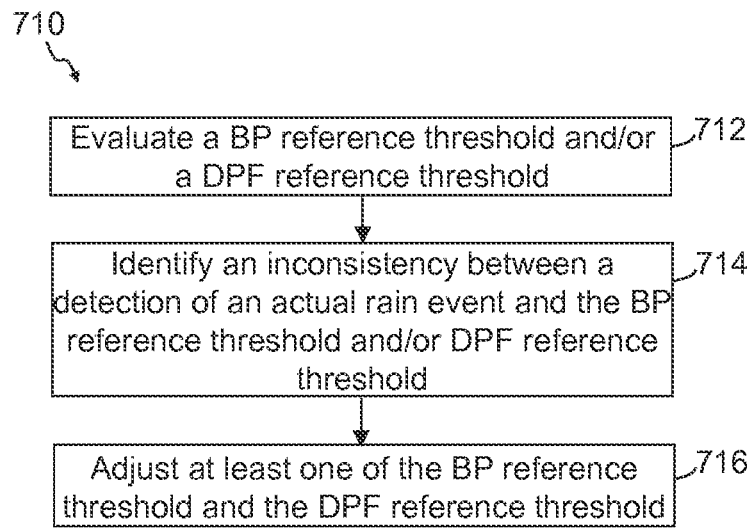
FIG. 7 shows a simplified flow diagram of an exemplary process of adjusting reference threshold lines, in accordance with some embodiments.

FIG. 7 shows a simplified flow diagram of an exemplary process 710 of adjusting reference threshold lines 322, 324, in accordance with some embodiments. In step 712, the DPF reference threshold 322 and/or the BP reference threshold 324 are evaluated relative to at least the prediction that one or more rain events are likely to occur. Again, the evaluation can include comparing the prediction of a rain event and whether rain was actually received, a timing of when rain was actually received relative to when rain is predicted, a current DPF value relative to the DPF reference threshold 322, a current DPF value relative to the DPF reference threshold 322 when a rain event is actually detected, a current BP value relative to the BP reference threshold, a current BP value relative to the BP reference threshold when a rain event is actually detected, other such evaluations, or a combination of such evaluations.

In step 714, one or more inconsistencies are identified between a detection of an actual rain event and the DPF reference threshold 322 and/or the BP reference threshold 324 based on the evaluation of the reference thresholds. In many embodiments, the inconsistencies are tracked over time, for example, over multiple different predicted rain events. As a further example, an accuracy of a prediction and an accuracy of a predicted time of the rain event can be identified through the evaluation of the one or more reference thresholds based on two or more predicted rain events. Similarly, the inconsistencies may be evaluated in relation to one or more threshold. In step 716, one or both of the DPF reference threshold 322 and/or the BP reference threshold 324 are adjusted based at least in part on the identified inconsistencies. The adjustments are typically relatively small and in some instances may be proportional to the degree of inconsistency detected. By adjusting the reference thresholds, the accuracy of the predicted rain events can be increased.

In some embodiments, the reference thresholds are defined from factory default values. Similarly, a zip code, longitude and/or latitude information, city and/or other such information may be selected and/or provided, with reference threshold being initially set based on the information. Accordingly, the adjustments allow fine tuning of the reference thresholds for a given location. As described above, in some embodiments, the identified inconsistencies are typically evaluated over more than one predicted rain event, and/or the inconsistencies may be evaluated relative to one or more thresholds such that the BP and/or DPF reference thresholds are not modified unless the inconsistencies exceed one or more inconsistency thresholds. The use of the one or more threshold further reduces the fluctuation of the reference thresholds as seasons change and/or based on variations in typical weather patterns occur.

Again, the prediction of rain events allows the rain prediction system and/or the irrigation controller to take advantage of expected rain events, reduce over watering, reduce costs based on unneeded irrigation, allows compliance with regulations, and other such benefits. Further, the use of both the DPF profile and the BP profile in at least some embodiments provides for a more accurate prediction, and in some instances, allows for an earlier prediction of a rain event allowing the irrigation controller to reduce irrigation and take greater advantage of the predicted rain. As described above, the rain prediction system 114 operates in some embodiments based on environmental conditions trends and value ranges. Confidence levels and/or values regarding a predicted future rain event often increase with temporal proximity to target trends and/or value conditions. In some embodiments, predictive uncertainty decreases with the difference between current and target environmental conditions (e.g., current BP values, BP profile, current DPF values and DPF profile likely to precede a rain event). Because these values can change rapidly, the prediction of a rain event is typically to occur within a relatively short forecast intervals, and often less than 72 hours.

Additionally, in some embodiments, the rain prediction system 114 and/or irrigation controller 112 take into account the real-time outcome of a predicted event and factor it into the overall schedule adjustment over the prediction-to-result time frame. Corrections to one or more subsequent watering cycles may therefore take into account current incremental water deficits (e.g., expressed through one or more recent ET ratios), current environmental trends and/or conditions (e.g., expressed through a predicted rain event confidence level), one or more past schedule adjustments based on correction factors, rainfall information and/or other such information, and typically a combination of two or more of these factors.

In some embodiments, the correction factors are determined in accordance with an irrigation schedule. In other embodiments, correction factors may be generated multiple times a day, on a daily based or other such scheduling. Further, an adjusted correction factor may be determined in response to non-watering cycles, days or the like for one or more valves. For example, an average correction factor may be calculated over the number of non-irrigation days since the last watering cycle.

Some ET based irrigation controllers adjust watering cycles based on the most recent ET data and/or ET ratio calculation. Some embodiments additionally take into consideration the one or more correction factors based on predicted rain events. For example, daily correction factors can be averaged for each program watering interval to provide relevant adjusted correction factors. In many instances, the same data set used to calculate an ET can be used for the irrigation programs of an irrigation controller for a given time, while separate average correction values may be calculated for each irrigation program. Further, in some embodiments, once an irrigation controller implements irrigation and waters plant life, one or more prior correction factors for the relevant irrigation program implemented are no longer relevant. The determination of an adjusted correction factor typically takes into consideration the correction factors corresponding to the days since the last watering day. Often, irrigation controllers provide for multiple different irrigation programs, which can have different defined irrigation watering days. Accordingly, in many embodiments when an irrigation controller has different irrigation programs, adjusted correction factors can be determined relative to each irrigation program.

Example 1—Daily Irrigation Program

As one example, an irrigation controller in accordance with some embodiments may be programmed with one or more daily irrigation programs. In this example, watering days are scheduled to be Monday, Thursday and Friday. Starting, in this example, on Tuesday, a correction factor is generated on Tuesday and provided to the irrigation controller 112. In some embodiments the irrigation controller requests the correction factor from the rain prediction system 114. Further, in many embodiments, multiple previous correction factors along with a most current correction factor are provided to the irrigation controller. For example, the seven most recent days' correction factors may be provided to the irrigation controller. Tuesday is programmed as a non-watering day. Accordingly, the irrigation controller does not use the correction factors and does not adjust irrigation. Similarly, a correction factor is generated for Wednesday and one or more of the most recent correction factors are provided to the irrigation controller. Again, Wednesday is a non-watering day and the irrigation controller does not use the correction factors.

Continuing this example, Thursday is defined as an irrigation day. The irrigation controller again receives the one or more most recent correction factors (e.g., the rain prediction system 114 provides the seven most recent daily correction factors). The irrigation controller 112 determines a last watering day was three days ago (i.e., on Monday), and averages the three most recent daily correction factors (e.g., from the seven received). An adjusted correction factor is calculated (e.g., averaging the three most recent correction factors corresponding to the days since the last watering cycle (i.e., Tuesday's, Wednesday's and Thursday's correction factors), and the calculated adjusted correction factor is applied on Thursday to the station run times of the irrigation program. Friday is also defined an irrigation day, and as such the irrigation controller 112 receives the day's correction factor. Again, in many embodiments, the rain prediction system 114 provides multiple days (e.g., seven most recent days) of correction factors. Because irrigation was implemented on the previous day (i.e., Thursday is programmed as an irrigation day) the irrigation controller 112 uses the current day's correction factor, and does not average multiple correction factors. Using the current day's correction factor the irrigation controller applies the correction factor to the station run times scheduled to be activated on Friday.

In this example, Saturday and Sunday are scheduled as non-irrigation days. In some embodiments, the irrigation controller still requests and/or otherwise receives relevant correction factors for Saturday and Sunday, without applying those factors. Monday is further programmed as an irrigation day. Upon receiving the multiple correction factors, the irrigation controller generates an adjusted correction factor bases on the three most recent days' correction factors (i.e., corresponding to Saturday, Sunday and Monday) and applies the adjusted correction factor to the station run times programmed for Monday.

Example 2—Cyclic Irrigation Program

As another example, some irrigation controllers in accordance with some embodiments allow one or more cyclic irrigation programs to be defined that control irrigation in accordance with the cyclic program. In this example, the irrigation controller 112 is programmed with a cyclic program with a 10 day watering period with every 10th day defined as an irrigation day for one or more relevant stations associated with the cyclic program. Again, assuming the rain prediction system 114 is configured to operate on a seven day cycle, the rain prediction system provides the seven most recent day's correction factors to the irrigation controller. The irrigation controller does not use the correction factors with the 10 day cyclic irrigation program on days 1-6. Day 7 is also a non-irrigation day. However, because the irrigation controller uses a 7 day programming schedule and the relevant correction factors do not want to be lost, on day 7 the irrigation controller receives the seven most recent days' correction factors, and generates an adjusted correction factor (e.g., an average correction factor) from the seven most recent days' correction factors. Days 8 and 9 are also programmed as non-irrigation days, and as such the irrigation controller does not use correction factors on those days.

The 10th day is programmed as the irrigation watering day. The irrigation controller receives the seven most recent day's correction factors. Because the cycle is a 10 day cycle, the irrigation controller knows that three days have passed since the last adjusted correction factor was determined. Accordingly, the irrigation controller uses the three most recent days' correction factors with the adjusted correction factors and determines an updated adjusted correction factor (e.g., averages the adjusted correction factor and the three most recent days' correction factors). Using the updated adjusted correction factor, the irrigation controller applies the updated adjusted correction factor to each relevant station run time associated with the 10 day cycle. In other embodiments, a continuous average correction factor is maintained and on the scheduled irrigation watering day, average correction factor is applied.

Figure 8:
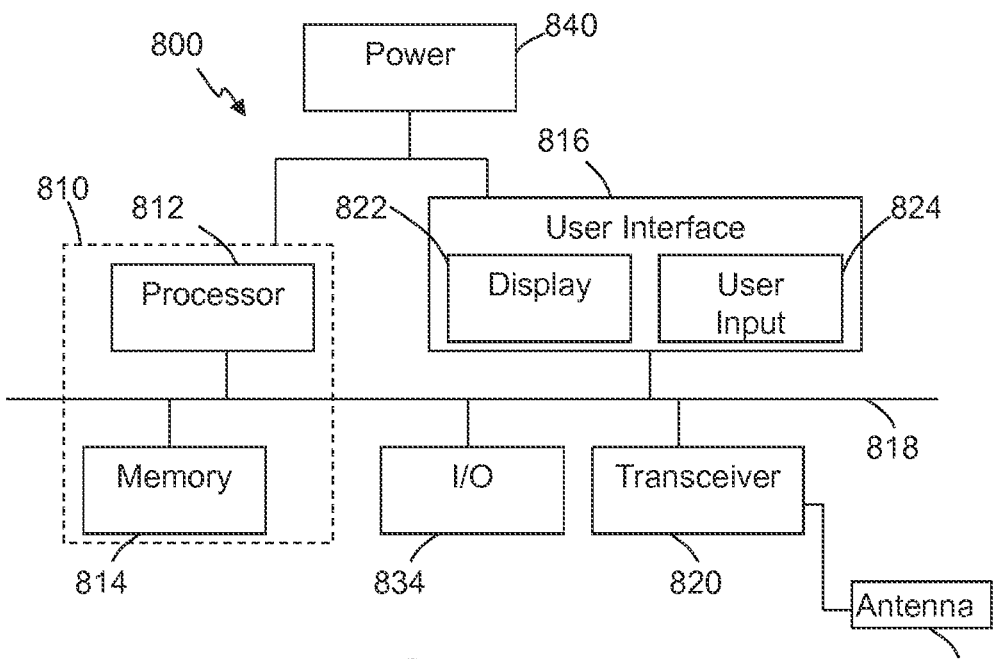
FIG. 8 illustrates a system for use in implementing methods, techniques, devices, apparatuses, systems, sources and the like in determining whether a rain event is likely to occur in accordance with some embodiments.

The methods, techniques, systems, devices, services, sources and the like described herein may be utilized, implemented and/or run on many different types of devices and/or systems. Referring to FIG. 8, there is illustrated a system 800 that may be used for any such implementations, in accordance with some embodiments. One or more components of the system 800 may be used for implementing any system, apparatus or device mentioned above or below, or parts of such systems, apparatuses or devices, such as for example any of the above or below mentioned irrigation controller 112, rain prediction system 114, sensor 116 and the like. However, the use of the system 800 or any portion thereof is certainly not required.

By way of example, the system 800 may comprise a controller or processor module 812, memory 814, and one or more communication links, paths, buses or the like 818. A power source or supply 840 is included or coupled with the system 800. The controller 812 can be implemented through one or more processors, microprocessors, central processing unit, logic, local digital storage, firmware and/or other control hardware and/or software, and may be used to execute or assist in executing the steps of the processes, methods and techniques described herein, and control various communications, programs, processes, sensors, interfaces, etc. Further, in some embodiments, the controller 812 can be part of a control system 810 and/or implemented through one or more processors with access to one or more memory 814.

In some embodiments, the system 800 includes a user interface 816 that allows a user to interact with the system 800 and/or to receive information through the system. In some instances, the user interface 816 includes a display 822 and/or one or more user inputs 824, such as a buttons, dials, touch pad, touch screen, track ball, remote control, keyboard, mouse, etc., which can be part of or wired or wirelessly coupled with the system 800.

Further, in some embodiments, the system 800 includes one or more communication interfaces, ports, transmitters, receivers and/or transceivers 820 and the like allowing the system 800 to communication over a communication bus, a distributed network, a local network, the Internet, communication link 818, other networks or communication channels with other devices and/or other such communications or combinations thereof. Further the transceiver 820 can be configured for wired, wireless, optical, fiber optical cable or other such communication configurations or combinations of such communications. For example, the transceiver 820 may communicate with one or more sensors 116 and/or provide communication between a rain prediction system 114 and an irrigation controller 112.

The system 800 comprises an example of a control and/or processor-based system with the controller 812. Again, the controller 812 can be implemented through one or more processors, controllers, central processing units, logic, software and the like. Further, in some implementations the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory 814 can be internal, external or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store code, software, executables, scripts, data, graphics, correction factors, irrigation programs, irrigation schedules, runtimes, mapping information, programming, programs, textual content, identifiers, log or history data, user information and the like.

One or more of the embodiments, methods, processes, approaches, and/or techniques described above or below may be implemented in one or more computer programs executable by a processor-based system. By way of example, such a processor based system may comprise the processor based system 800, a computer, an irrigation controller, a rain prediction system, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for determining whether a rain event is likely and/or adjusting irrigation runtimes in accordance with a predicted rain event. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: obtaining a barometric pressure (BP) profile corresponding to changes in BP over a period of time and corresponding to a location where irrigation is to be controlled; determining a dew point factor (DPF) profile as a function of changes in temperature and relative humidity over the period of time and corresponding to the location where irrigation is to be controlled; making a determination that a rain event is likely to occur as a function of both the BP profile and the DPF profile; and generating, based on the determination that the rain event is likely to occur, a control signal configured to cause one or both of current and scheduled irrigation to be limited.

Other embodiments provide one or more computer-readable storage mediums storing one or more computer programs configured for use with a computer simulation, the one or more computer programs configured to cause a computer and/or processor based system to execute steps comprising: predicting that a rain event is likely to occur at a site to be irrigated; generating a local correction factor in response to predicting the rain event, wherein the correction factor is configured to be applied in adjusting one or more irrigation runtimes implemented by an irrigation controller at the site to result in one or more corresponding adjusted irrigation runtimes that are less than the corresponding one or more irrigation runtimes; determining whether rain is received sufficient to compensate for an estimated amount of water that was not distributed because of an implementation of the one or more adjusted irrigation runtimes; calculating a local compensation factor in response to determining the received rain is insufficient to compensate for the estimated amount of water that was not distributed in the implementation of the one or more adjusted irrigation runtimes; and causing the compensation factor to be applied in subsequently adjusting the one or more irrigation runtimes.

Still further, some embodiments provide one or more computer-readable storage mediums storing one or more computer programs configured for use with a computer simulation, the one or more computer programs configured to cause a computer and/or processor based system to execute steps comprising: determining that a rain event is likely to occur as a function of a barometric pressure (BP) profile relative to a BP reference threshold and a dew point factor (DPF) profile relative to a DPF reference threshold; evaluating, as a function of two or more different predicted rain events, at least one of the BP reference threshold and the DPF reference threshold; identifying an inconsistency between a detection of an actual rain event and the at least one of the BP reference threshold and the DPF reference threshold; and adjusting the at least one of the BP reference threshold and the DPF reference threshold in response to identifying the inconsistency.

Some embodiments predict rain events based on environmental conditions trends and value ranges. Often, the ability to express confidence about a predicted future rain event increases with temporal proximity to target and/or thresholds of trends and/or values conditions. As such, the predictive uncertainty typically decreases with the difference between current and reference threshold environmental conditions. Further, the prediction that a rain event is likely is often relevant over relatively short forecast intervals (e.g., less than 72 hours, and often less than 48 hours). Accordingly, in many embodiments, the rain prediction system 114 and the irrigation controller 112 are configured to operate on irrigation cycle correction factors in these time frames.

As described above, in many embodiments, the rain prediction system 114 and/or the irrigation controller 112 take into account the real-time outcome of a predicted event and factor the amount of received rain (or lack thereof) into subsequent correction factors and resulting irrigation schedule adjustment. Adjustments and/or corrections to watering cycle can therefore take into account current incremental water deficiencies (e.g., one or more expressed through sensed rain amounts, one or more recent ET ratios, DPF values, BP values and/or other such parameters), as well as current environmental trends and/or conditions (expressed through the BP profile, DPF profile, a rain event anticipator confidence levels, and/or other such trends), past schedule adjustments, rainfall information and the like. In some embodiments, the rain prediction system 114 and/or the irrigation controller 112 keep track of a limited number of previous correction factors, past schedule corrections, and the like, and factor them into subsequent correction factors and/or adjustments to irrigation runtimes.

In some embodiments, these characteristics are utilized on a daily bases and applied to irrigation schedules. In the case of a daily irrigation schedule at the irrigation controller, the correction factor is provided by the rain prediction system and used by the irrigation controller when irrigation is to be applied. Some embodiments generate an adjusted correction factor (e.g., average correction factor) calculated by the irrigation controller and/or the rain prediction system over a number of non-irrigation days since the last watering cycle. Further, in some embodiments, the irrigation controller 112 receives input from an ET calculation system in addition to the rain prediction system, or the rain prediction system is part of an ET calculation system. Accordingly, the ET value received through the ET system is used in cooperation with the correction factor. Still further, in some embodiments, the irrigation controller applies the correction factor through a seasonal adjust feature of the irrigation controller. Again, the irrigation controller may cooperatively apply the correction factor and a seasonal adjust value (e.g., by adding the seasonal adjust value and the correction factor, calculating a ratio, or other such cooperative application of the correction factor and a seasonal adjust value). In other embodiments, however, the user is discouraged from setting a seasonal adjust, and the irrigation controller applies the correction factor through the seasonal adjust functionality.

Exemplary processes and/or methods are representatively described above based on one or more flow diagrams, timing diagrams, logic, and/or diagrams representing sequences of actions and/or communications that include one or more steps, subprocesses, decisions, communications and/or other such representative divisions of the processes, methods, etc. These steps, subprocesses or other such actions can be performed in different sequences without departing from the spirit of the processes, methods and apparatuses. Additionally or alternatively, one or more steps, subprocesses, actions, etc. can be added, removed or combined in some implementations.

While the invention herein disclosed has been described by means of specific embodiments, examples and applications thereof, numerous modifications and variations could be made thereto by those skilled in the art without departing from the scope of the invention set forth in the claims.

What is claimed is:
1. A method of controlling irrigation, the method comprising:
  obtaining a barometric pressure (BP) profile corresponding to changes in BP over a period of time and corresponding to a location where irrigation is to be controlled;
  determining a dew point factor (DPF) profile as a function of changes in temperature and relative humidity over the period of time and corresponding to the location where irrigation is to be controlled;
  making a determination that a rain event is likely to occur as a function of both the BP profile and the DPF profile; and
  generating, based on the determination that the rain event is likely to occur, a control signal configured to cause one or both of current and scheduled irrigation to be limited;
  wherein the step of making the determination that the rain event is likely comprises:
    identifying a slope of the BP profile over the period of time;
    identifying a slope of the DPF profile over the period of time; and
    determination that the rain event is likely to occur as a function of the slope of the BP profile and the slope of the DPF profile; and
  generating a correction factor in response to determining the rain event is likely, wherein the correction factor is proportional to at least one of the slope of the BP profile or the slope of the DPF profile and the correction factor is configured to be applied in adjusting irrigation runtimes.

2. The method of claim 1, further comprising:
  limiting, in response to the control signal, one or both of current and scheduled irrigation based on the determination that the rain event is likely to occur.

3. The method of claim 1, wherein the step of generating the control signal comprises:
  generating the correction factor in response to the step of making the determination the rain event is likely.

4. The method of claim 3, further comprising:
  communicating the correction factor along with multiple previous correction factors calculated for previous days to an irrigation controller, wherein the correction factor and the multiple previous correction factors are configured to be cooperatively used by the irrigation controller in determining adjustments to the irrigation runtimes.

5. The method of claim 3, further comprising:
  averaging the correction factor with one or more previous correction factors calculated for previous days and generating an averaged correction factor configured to be used in adjusting the irrigation runtimes.

6. The method of claim 3, wherein the correction factor comprises a percentage adjustment configured to cause the irrigation runtimes to be adjusted proportionally to the percentage adjustment.

7. The method of claim 1, wherein the step of making the determination that the rain event is likely comprises:
  predicting an approximate time when the rain event is expected to occur as a function of the identified slope of the at least one of the BP profile or the DPF profile.

8. The method of claim 1, wherein the step of making the determination that the rain event is likely comprises:
  determining whether a current BP has a predetermined relationship with a BP reference threshold;
  determining whether a current DPF has a predetermined relationship with a DPF reference threshold; and
  determination that the rain event is likely to occur as a function of whether one or both the current BP has the predetermined relationship with the BP reference threshold and the current DPF has the predetermined relationship with the DPF reference threshold.

9. The method of claim 1, further comprising:
  determining whether a predicted rain event occurred;
  calculating a compensation factor in response to determining that the rain event did not occur; and
  applying the compensation factor in calculating one or more subsequent correction factors.

10. The method of claim 1, further comprising:
  determining whether an amount of rain detected during a rain event compensates for water not applied as a result of limiting one or both of the current and the scheduled irrigation; and calculating a compensation factor in response to determining that the amount of rain does not compensate for water not applied.

11. The method of claim 1, wherein the step of making the determination the rain event is likely comprises:
   detecting that the BP profile has a predetermined relationship with a threshold rate of change of the BP; and
   detecting that the DPF profile has a predetermined relationship with a threshold rate of change of the DPF.

12. The method of claim 1, wherein the step of generating the control signal comprises generating the control signal configured to suspend at least one of the current or scheduled irrigation.

13. The method of claim 1, wherein the DPF profile comprises a dew point differential (DPD) profile, wherein the DPD profile is proportional to a change over the period of time of a difference between temperate and a dew point temperature.

14. The method of claim 1, wherein the generating the control signal comprises generating a control signal control signal configured to cause an interrupt of one or both of the current and the scheduled irrigation based on the determination that the rain event is likely to occur.

15. A method of controlling irrigation, the method comprising:
   obtaining a barometric pressure (BP) profile corresponding to changes in BP over a period of time and corresponding to a location where irrigation is to be controlled;
   determining a dew point factor (DPF) profile as a function of changes in temperature and relative humidity over the period of time and corresponding to the location where irrigation is to be controlled;
   making a determination that a rain event is likely to occur as a function of both the BP profile and the DPF profile; and
   generating, based on the determination that the rain event is likely to occur, a control signal to adjust one or both of current and scheduled irrigation to be limited;
   wherein the step of making the determination that the rain event is likely comprises:
      identifying a slope of the BP profile over the period of time;
      identifying a slope of the DPF profile over the period of time; and
      determination that the rain event is likely to occur as a function of the slope of the BP profile and the slope of the DPF profile; and
   wherein the step of making the determination that the rain event is likely to occur comprises:
   identifying that at least one of the slope of the BP profile or the slope of the DPF profile is decreasing at a rate that has a predetermined relationship with a first threshold, and the other of the slope of the BP profile and the slope of the DPF profile is not increasing at a rate that has a predetermined relationship with a second threshold.

16. The method of claim 1, further comprising:
   generating a correction factor in response to predicting the rain event, wherein the correction factor is configured to be applied in adjusting one or more irrigation runtimes implemented by an irrigation controller at the site to result in one or more corresponding adjusted irrigation runtimes that are less than the corresponding one or more irrigation runtimes;
   determining whether a sensed amount of rain is received sufficient to compensate for an estimated amount of water that was not distributed because of an implementation of the one or more adjusted irrigation runtimes;
   calculating a compensation factor in response to determining the received amount of rain is insufficient to compensate for the estimated amount of water that was not distributed in the implementation of the one or more adjusted irrigation runtimes; and
   causing the compensation factor to be applied in subsequently adjusting the one or more irrigation runtimes.

17. The method of claim 16, wherein the causing the compensation factor to be applied comprises distributing the compensation factor over multiple irrigation days such that a portion of the compensation factor is applied on each of the multiple irrigation days.

18. The method of claim 17, further comprising:
   identifying a watering restriction;
   identifying that applying the compensation factor to a single irrigation day would result in exceeding the watering restriction; and
   implementing distributing the compensation factor over multiple irrigation days in response to identifying the watering restriction would be exceeded.

19. The method of claim 16, wherein the causing the compensation factor to be applied comprises causing the compensation factor to be applied independent of one or more other irrigation controller implemented runtime adjustments.

20. The method of claim 1 further comprising:
   evaluating, as a function of two or more different predicted rain events, at least one of a BP reference threshold or a DPF reference threshold;
   identifying an inconsistency between a detection of an actual rain event and the at least one of the BP reference threshold or the DPF reference threshold; and
   adjusting the at least one of the BP reference threshold or the DPF reference threshold in response to identifying the inconsistency.

21. The method of claim 20, further comprising:
   evaluating the at least one of the slope the BP profile or the slope of the DPF profile relative to when it crosses the BP reference threshold and the DPF reference threshold, respectively.

22. The method of claim 21 wherein the determining that the rain event is likely to occur comprises:
   determining that the rain event is likely to occur as a function of at least the evaluated slope of the BP profile relative to when it crosses the BP reference threshold, the evaluated slope of the DPF profile relative to when it crosses the DPF reference threshold, the BP profile relative to the BP reference threshold, or the DPF profile relative to the DPF reference threshold.

23. The method of claim 20, further comprising:
   identifying, for each of the two or more predicted rain events, an accuracy of the prediction and an accuracy of a predicted time of the rain event;
   wherein the adjusting the at least one of the BP reference threshold or the DPF reference threshold comprises adjusting the at least one of the BP reference threshold or the DPF reference threshold as a function of the accuracy of the prediction and the accuracy of the predicted time of the rain event.

24. A system of controlling irrigation, comprising:
   a processor;
   a memory coupled with the processor and storing program code that when implemented by the processor causes the processor to:

obtain a barometric pressure (BP) profile corresponding to a change in BP over a period of time and corresponding to a location where irrigation is to be controlled;

determine a dew point factor (DPF) profile proportional to changes in temperature and relative humidity over the period of time and corresponding to the location where irrigation is to be controlled;

determine that a rain event is likely to occur as a function of both the current BP profile and the current DPF profile comprising identifying a slope of the BP profile over the period of time, identifying a slope of the DPF profile over the period of time, and determining that the rain event is likely to occur as a function of the slope of the BP profile and the slope of the DPF profile;

generate a correction factor in response to determining the rain event is likely, wherein the correction factor is proportional to at least one of the slope of the BP profile or the slope of the DPF profile and the correction factor is configured to be applied in adjusting irrigation runtimes; and generate a control signal configured to cause one or both of current and scheduled irrigation to be limited based on the determination that the rain event is likely to occur.

25. The system of claim 24, wherein the processor, in generating the control signal, is configured to generate the correction factor in response to determining the rain event is likely, wherein the correction factor is configured to be applied in adjusting irrigation runtimes in response to the determination that the rain event is likely.

26. The system of claim 25, further comprising:
a transmitter coupled with the processor, wherein the transmitter is configured to transmit the correction factor to an irrigation controller.

27. The system of claim 24, wherein the processor is further configured to receive communications from one or more sensors, and to determine at least one of the BP profile or the DPF profile as a function of the communications received from the one or more sensors.

28. The system of claim 24, further comprising:
one or more sensors coupled with the processor, wherein the one or more sensors are configured to sense parameters used by the processor in determining at least one of the BP profile or the DPF profile.

* * * * *

UNITED STATES PATENT AND TRADEMARK OFFICE
CERTIFICATE OF CORRECTION

PATENT NO. : 10,206,341 B2
APPLICATION NO. : 14/805411
DATED : February 19, 2019
INVENTOR(S) : Anderson I. Micu It is certified that error appears in the above-identified patent and that said Letters Patent is hereby corrected as shown below:

In the Claims

Column 25, Line 20, Claim 14, delete the first instance of "control signal".
Column 26, Line 40, Claim 21, delete "slope" and replace with --slope of--, therefor.

Signed and Sealed this
Twenty-third Day of April, 2019

Andrei Iancu
*Director of the United States Patent and Trademark Office*